:::: {.flex-container}
(12) United States Patent
Yamamoto et al.

(10) Patent No.: US 8,050,626 B2
(45) Date of Patent: Nov. 1, 2011
::::

(54) PORTABLE TERMINAL AND PORTABLE TELEPHONE

(75) Inventors: Tadayoshi Yamamoto, Kato-gun (JP); Takashi Tanii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/947,372

(22) Filed: Nov. 16, 2010

(65) Prior Publication Data
US 2011/0065395 A1 Mar. 17, 2011

Related U.S. Application Data

(62) Division of application No. 11/723,788, filed on Mar. 22, 2007, which is a division of application No. 10/776,305, filed on Feb. 12, 2004, now Pat. No. 7,245,873.

(30) Foreign Application Priority Data

Mar. 28, 2003  (JP) ................................. 2003-092643

(51) Int. Cl.
*H04B 7/00* (2006.01)
(52) U.S. Cl. .......... 455/41.2; 455/41.1; 455/39; 455/73; 455/78
(58) Field of Classification Search ............... 455/41.1, 455/41.2, 39, 73, 78, 83, 7, 11.1
See application file for complete search history.

(56) References Cited

U.S. PATENT DOCUMENTS

| | | | |
|---|---|---|---|
| 4,659,878 A | 4/1987 | Dinkins | |
| 6,324,380 B1 * | 11/2001 | Kiuchi et al. | 455/12.1 |
| 6,766,175 B2 | 7/2004 | Uchiyama | |
| 6,865,401 B2 | 3/2005 | Kotzin | |
| 7,072,675 B1 | 7/2006 | Kanakubo | |
| 7,149,480 B2 | 12/2006 | Miyahara | |
| 7,242,905 B2 | 7/2007 | Kim | |
| RE40,910 E | 9/2009 | Aoki et al. | |
| 2001/0012761 A1 | 8/2001 | Mitama et al. | |

(Continued)

FOREIGN PATENT DOCUMENTS

JP   06-112891 A   4/1994

(Continued)

OTHER PUBLICATIONS

Notice of Allowance issued Nov. 30, 2010.

*Primary Examiner* — Tuan Pham
(74) *Attorney, Agent, or Firm* — Arent Fox LLP

(57) ABSTRACT

The invention relates to a portable terminal such as a portable telephone terminal and so forth for effecting communication, information processing and so forth, and to provide the portable terminal and a master slave portable telephone system capable of rendering a transmission and/or reception mode of information to be multi-functional to enhance communication function, thereby enhancing the convenience thereof. The portable terminal comprises an information transmission and/or reception part for effecting transmission and/or reception of information, a radio communication part for effecting communication by radio, and an information processing part for processing information. The portable terminal can effect transmission and/or reception of information relative to another portable terminal by any of a master terminal made up of the information transmission and/or reception part and the information processing part, a slave terminal made up of the information transmission and/or reception part and the radio communication part, and a normal terminal configured by combining the radio communication part with the information processing part via the information transmission and/or reception part.

2 Claims, 24 Drawing Sheets

U.S. PATENT DOCUMENTS

| | | |
|---|---|---|
| 2002/0025839 A1 | 2/2002 | Usui |
| 2002/0072390 A1 | 6/2002 | Uchiyama |
| 2002/0173277 A1* | 11/2002 | Takao et al. .................... 455/77 |
| 2004/0185902 A1 | 9/2004 | Yang |
| 2005/0119014 A1 | 6/2005 | Bandell et al. |

FOREIGN PATENT DOCUMENTS

| | | |
|---|---|---|
| JP | 08-181744 A | 7/1996 |
| JP | 2001-168982 A | 6/2001 |
| JP | 2002-232506 A | 6/2001 |
| JP | 2001-218269 A | 8/2001 |
| JP | 2001-298780 A | 10/2001 |
| JP | 2002-009689 A | 1/2002 |
| JP | 2002 077334 A | 3/2002 |
| JP | 2002-077334 A | 3/2002 |
| JP | 2002-141857 A | 5/2002 |
| JP | 2002-247233 A | 8/2002 |
| JP | 2004-297124 A | 10/2004 |

* cited by examiner

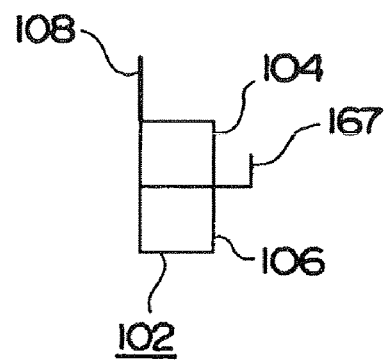
F I G. 17A
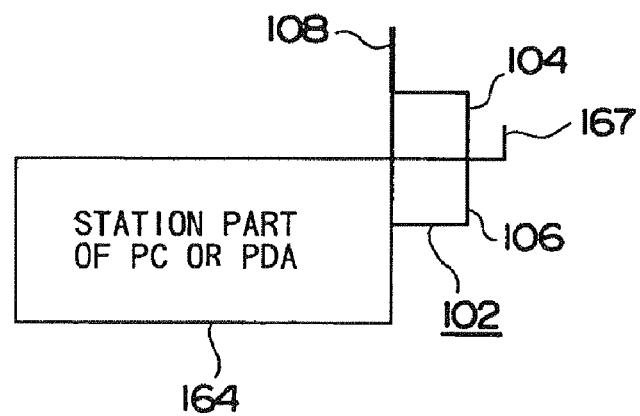
F I G. 17B

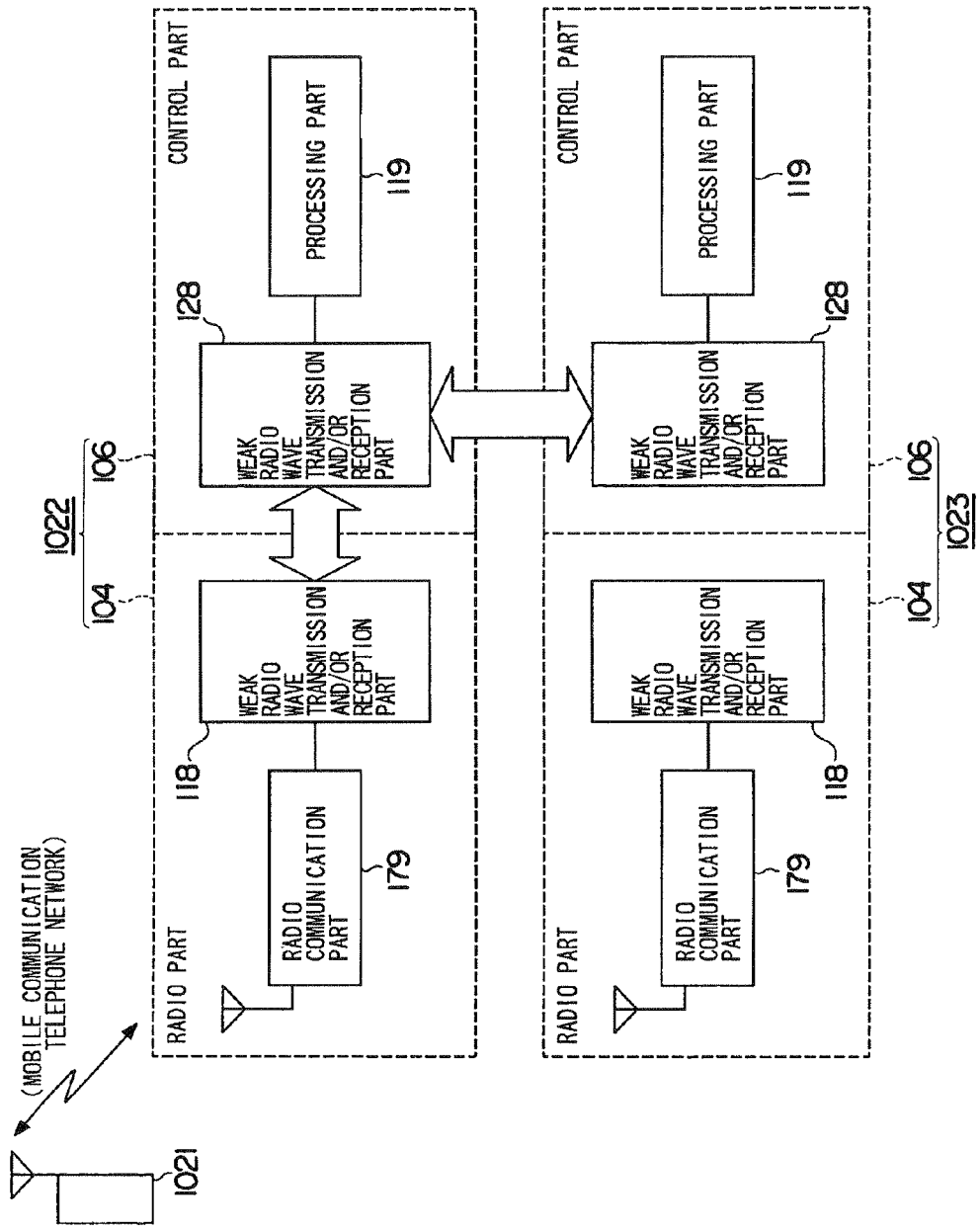
F I G. 18

F I G. 22
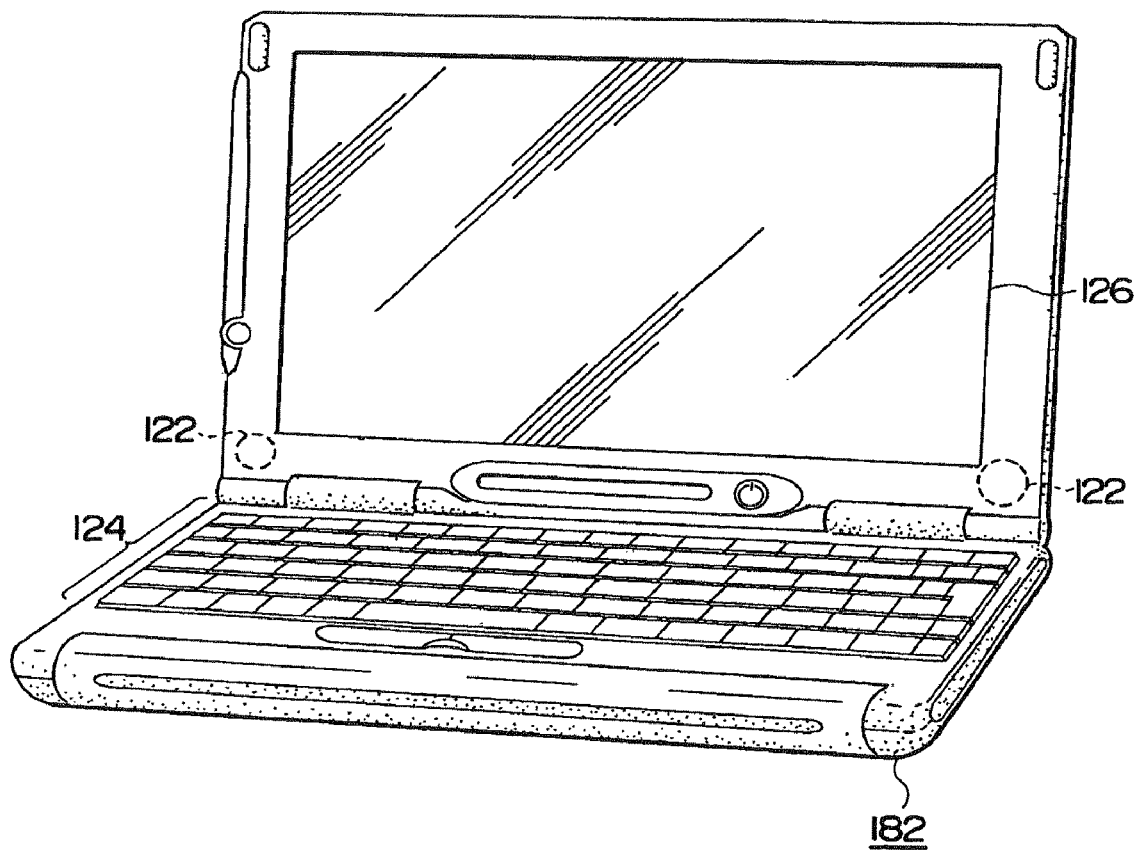

PORTABLE TERMINAL AND PORTABLE TELEPHONE

BACKGROUND OF THE INVENTION

1. Field of the Invention

The invention relates to a portable terminal and a portable telephone such as a 3G (third Generation mode telecommunication) terminal and so forth, particularly to a portable terminal and a portable telephone corresponding to various communication systems such a W-CDMA (Wideband-Code Division Multiple Access) system and so forth and a master slave portable telephone system.

2. Description of the Related Art

A portable terminal corresponding to a conventional communication system is configured, for example, as shown in FIG. 1. FIG. 1 shows the summary of a portable terminal. A portable terminal 2 has a radio part 4 and a control part 6 as a basic configuration. The radio part 4 in the preceding stage is a part for effecting transmission and/or reception of an RF (Radio Frequency) signal while using radio wave serving as a transmission medium, and has an antenna 8, a transmission and/or reception switching part 10, an RF (Radio Frequency) reception part 12, an RF transmission part 14, and a base band part 16. The control part 6 in the subsequent stage has a processing part 18, a microphone 20, a speaker 22, a keyboard 24, a display part 26 and so forth. The processing part 18 has a CPU (Central Processing Unit), a ROM (Read-Only Memory), a RAM (Random-Access Memory) and so forth, which execute a keyboard control, a voice amplification, a display control, an application control and so forth.

According to the portable terminal 2, a base band signal is demodulated from the RF signal received by the RF reception part 12, and a voice signal which is separated from the base band signal at the base band part 16 is reproduced as a voice by the speaker 22 via the processing part 18. Further, an input signal to the keyboard 24 and an input signal to the microphone 20 are converted into the base band signal by the base band part 16 via the processing part 18, and the converted base band signal is modulated at the RF transmission part 14 and is transmitted via the antenna 8 as the RF signal.

With such an arrangement of the portable terminal, the W-CDMA prevails as a future generation portable telephone system serving as a universal common portable telephone system, and a universal standard system of an IMT 2000 (International Mobile Telecommunication-2000), but the basic configuration of the portable terminal of this new communication system is the same as the configuration shown in FIG. 1. However, the portable telephone system of the new communication system mounts thereon a hardware and a software for realizing a high capacity data communication, a high image quality display, a high grade sound quality, thereby enhancing high-function compared with the portable telephone system of the conventional communication system.

There exists, for example, a patent document such as JP-A 2002-9689 disclosing the portable telephone relating to the W-CDMA.

JP-A 2002-9689 relates to a portable telephone for effecting communication by the W-CDMA system, and it plans to realize a portable telephone capable of more precisely specify a long code even under the influence of phasing.

Meanwhile, the portable terminal of the new communication system such as high-function W-CDMA and so forth is developing in respect of downsizing and low power consumption compared with the portable terminal of the existing communication system. That is, it makes the portable terminal difficult to be downsized and to be low in power consumption because downsizing and low power consumption of core components of the radio part 4 are insufficient and also a high image quality liquid crystal display is used on the display part 26 of the control part 6, and also the number of sound sources and the capacity of the memory increase, and still also signal processing elements are mounted on the portable terminal and so forth. Particularly, since the current consumption for executing high-function processing becomes large, the consumption of secondary cell serving as a power supply is significant, and there is a likelihood that a call standby time or call time becomes short.

In the area having small number of base station of a new communication system, a call condition is rendered unstable in a week electric field zone. For example, an obstruction such as the inside of the house and so forth brings about call obstruction, which causes an inconvenience such as the limitation of a call zone to a local part such as a location at a window of a building and so forth.

Still further, although the downsizing and low power consumption are achieved if the function of the high-function portable terminal is restricted, such a restriction runs counter to the high-function portable terminal, thereby spoiling the meaning for making the transition to the portable terminal of the new communication system.

Although the portable terminal disclosed in JP-A 2002-9689 realizes an excellent function for dealing with the problem for making the transition to the high-function portable terminal, the foregoing problem is not resolved.

SUMMARY OF THE INVENTION

A first object of the invention relates to a portable terminal such as a portable telephone terminal and so forth for effecting communication, information processing and so forth, and is to provide the portable terminal and a portable telephone capable of rendering a transmission and/or reception mode of information to be multi-functional to enhance communication function, thereby enhancing the convenience thereof.

A second object of the invention relates to a portable terminal such as a portable telephone terminal and so forth for effecting communication, information processing and so forth, and is to provide a portable terminal and a portable telephone provided with a master slave function capable of realizing downsizing with light weight, high-function, high sensitivity or low current consumption.

A third object of the invention relates to a portable terminal such as a portable telephone terminal and so forth, and is to provide a master slave portable telephone system by rendering a transmission and/or reception mode of information to be multi-functional, to enhance communication function.

To achieve the above first and second objects of the invention, the portable terminal of the invention comprises an information transmission and/or reception part (weak radio wave transmission and/or reception parts 118, 128), for effecting transmission and/or reception of information, a radio communication part (e.g., transmission and/or reception switching part 110 of a radio part 104, an RF reception part 112, an RF transmission part 114, a base band part 116) for effecting communication by radio, and an information processing part (processing part 119) for processing information described above. With the portable terminal of the invention, it can effect transmission and/or reception of information relative to another portable terminal by any of a master terminal made up of the information transmission and/or reception part and information processing part, a slave terminal made up of the information transmission and/or reception part and the radio communication part, and a normal terminal configured by combining the radio communication part with the information processing part via the information transmission and/or reception part, thereby achieving the above objects. The information transmission and/or reception part is a function part capable of effecting transmission and/or reception of information utilizing various transmission medium such as radio wave, supersonic wave, light and so forth. The radio communication part is a function part needed for effecting a long-range or short-range communication using transmission medium such as radio wave and so forth, for example, with a telephone and so forth using a public circuit. The information processing part is a function part for processing information which is transmitted and received, and may include a function part for controlling the radio communication part and the information transmission and/or reception part.

According to the portable terminal, it can be configured as a normal terminal capable of communicating and processing information singly by one portable terminal or it may be configured as a master terminal or a slave terminal wherein the master terminal can effect transmission and/or reception of information relative to another portable terminal serving as a slave terminal via information transmission and/or reception part, and the slave terminal can effect transmission and/or reception of information relative to another portable terminal serving as a master terminal via the information transmission and/or reception part.

To achieve the above first and second objects of the invention, the portable terminal of the invention comprises an information transmission and/or reception part for effecting transmission and/or reception of information, a radio communication part for effecting communication by radio, and an information processing part for processing information described above, and can be configured to be selectively switched to any of the first, second and third communication modes. According to the first communication mode, the portable terminal can effect transmission and/or reception of information relative to another portable terminal by combining the radio communication part with information processing part via the information transmission and/or reception part. According the second communication mode, the portable terminal can effect transmission and/or reception of information relative to another portable terminal using the information transmission and/or reception part and the information processing part. According to the third communication mode, the portable terminal can effect transmission and/or reception of information relative to another portable terminal using the information transmission and/or reception part and the radio communication part. According to the portable terminal of the invention, one portable terminal is provided with multiple communication modes which is switched to the communication mode in response to the need so as to cope with the diversification of the communication and information processing.

To achieve the first and second objects of the invention, the portable terminal of the invention comprises a radio part (104) and a control part (106). The radio part is provided with an information transmission and/or reception part (weak radio wave transmission and/or reception part 118) for effecting transmission and/or reception of information and it is a function part for effecting communication by radio, and the control part is provided with an information transmission and/or reception part (weak radio wave transmission and/or reception part 128) for effecting transmission and/or reception of information and it is a function part for processing information described above. According to the portable terminal, it is configured to effect transmission and/or reception of information relative to another portable terminal by both the radio part and the control part and to effect transmission and/or reception of information relative to another portable terminal by either the radio part or control part, thereby achieving the above objects.

To achieve the above first and second objects of the invention, the portable terminal of the invention is provided with first and second information transmission and/or reception parts (weak radio wave transmission and/or reception parts 1181, 1182) for effecting transmission and/or reception of information, a radio part (104) for effecting communication by radio, and first and second information transmission and/or reception parts (weak radio wave transmission and/or reception parts 1281, 1282) for effecting transmission and/or reception of information and also provided with a control part (106) for processing information. With such an arrangement, the radio part and control part can communicate with another portable terminal by effecting the transmission and/or reception of information via the first information transmission and/or reception part, and by the use of either the radio part or the control part, the transmission and/or reception of information relative to another portable terminal can be effected using the second information transmission and/or reception part.

To achieve the above first and second objects of the invention, the portable terminal may be provided with a switching part (switches 132, 134, 136) for combining the radio communication part with the information processing part or combining the information transmission and/or reception part with the radio communication part or the information processing part. With such an arrangement, the radio communication part and information processing part can share a single information transmission and/or reception part.

To achieve the above first and second objects of the invention, the portable terminal is provided with a station part (174) having an external antenna (178) wherein when the portable terminal is installed in the station part, the portable terminal can be connected to the external antenna. With such an arrangement, it is possible to effect communication in a weak electric field zone and to utilize various functions of the high-function portable terminal.

To achieve the above first and second objects of the invention, the portable terminal may be configured such that the portable terminal is functioned as the master terminal or the slave terminal within a communication range of the information transmission and/or reception part, and it is functioned as the normal terminal outside the communication range of the information transmission and/or reception part. That is, it is possible to effect transmission and/or reception of information while avoiding unstable communication in the weak electric field zone.

To achieve the above first and second objects of the invention, the station part may be configured to have a charger of a secondary battery incorporated in the portable terminal. That is, the portable terminal can be functioned as the slave terminal and so forth at the same time when the secondary battery, which is used as the power supply of the portable terminal installed in the station part, is charged.

To achieve the above first and second objects of the invention, the portable telephone of the invention may be configured to have the arrangement of the above-mentioned portable terminals.

To achieve a third object of the invention, the master slave portable telephone system of the invention configures a master slave system provided with first and second portable terminals comprising an information transmission and/or reception part for effecting transmission and/or reception of information, a radio communication part for effecting communication by radio, and an information processing part for processing information described above. According to the master slave portable telephone system, it can effect transmission and/or reception of information between the information processing part of the first portable terminal and the radio communication part of the second portable terminal or effect transmission and/or reception of information between the information processing part of the second portable terminal and the radio communication part of the first portable terminal via the information transmission and/or reception parts of first and second portable terminals, thereby achieving the third object of the invention. With such an arrangement, the first and second portable terminals can be used independently, and also these portable terminals are configured as the master slave system capable of effecting transmission and/or reception of information between both remote terminals so as to utilize the respective functions of these portable terminals in multiplication, thereby enhancing multi-function.

To achieve the above third object of the invention, the master slave portable telephone system of the invention is provided with an information transmission and/or reception part for effecting transmission and/or reception of information, a radio communication part for effecting communication by radio, and an information processing part for processing information described above, and also provided with first and second portable terminals functioning as the master terminal configured by the information transmission and/or reception part and the information processing part and also functioning as the slave terminal configured by the information transmission and/or reception part and the radio communication part. With the master slave portable telephone system of the invention, it is configured such that transmission and/or reception of information is effected between the first portable terminal and the second portable terminal via the information transmission and/or reception part by combining the master terminal with the slave terminal via the information transmission and/or reception parts of the first and second portable terminals, thereby achieving the third objects.

Other objects, features and advantages of the invention will be made more clear with reference to the attached drawings and each of the embodiments.

BRIEF DESCRIPTION OF THE DRAWINGS

FIGS. 17A and 17B are views each showing a summary of a portable terminal in the master slave portable telephone system according to the eighth embodiment of the invention;

FIG. 18 is a block diagram showing a master slave portable telephone system according to a ninth embodiment of the invention;

FIG. 22 is a perspective view showing a note type personal computer according to an eleventh embodiment of the invention;

DETAILED DESCRIPTION OF THE PREFERRED EMBODIMENTS

First Embodiment

Figure 1:
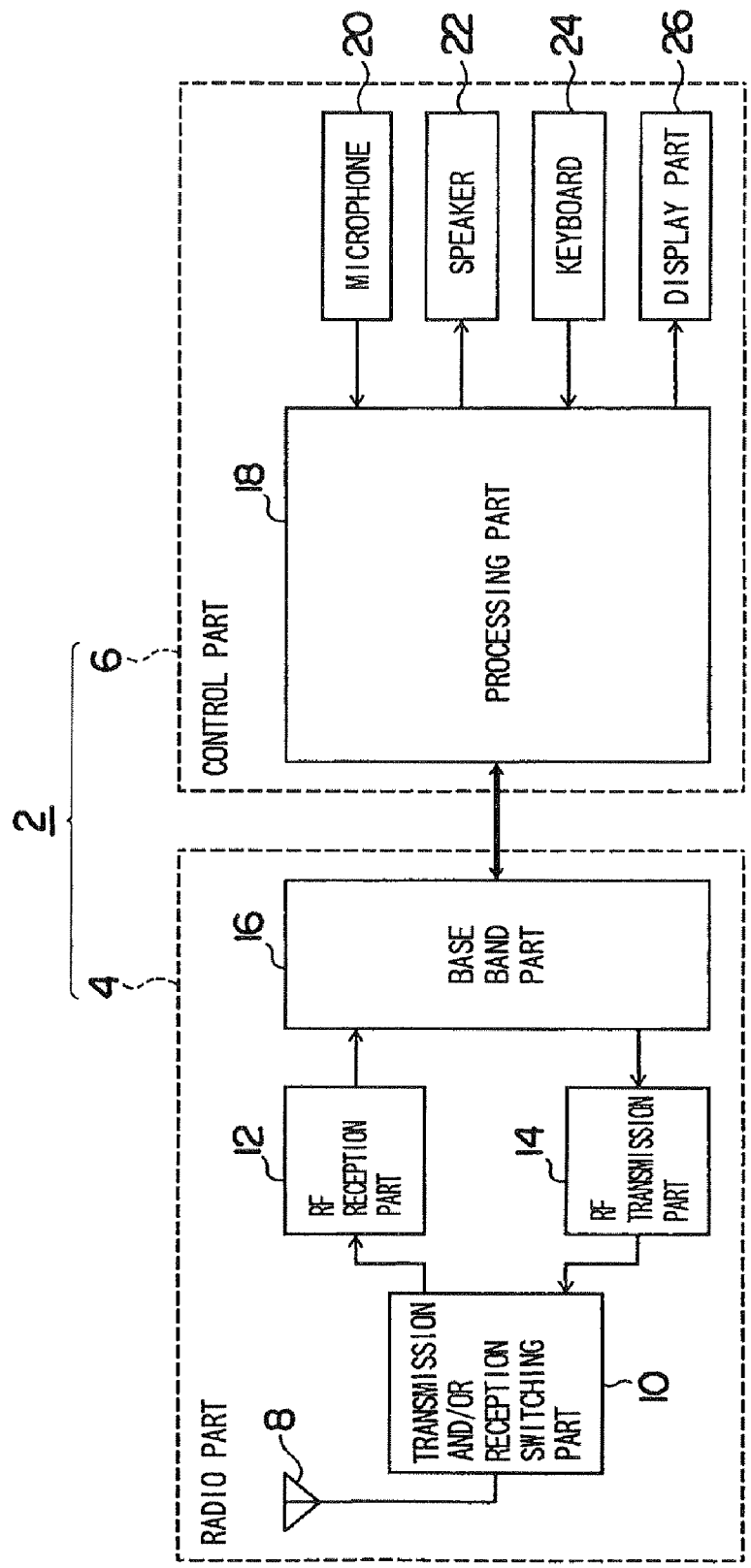
FIG. 1 is a block diagram showing a summary of a portable terminal corresponding to a conventional communication system.
Figure 2:
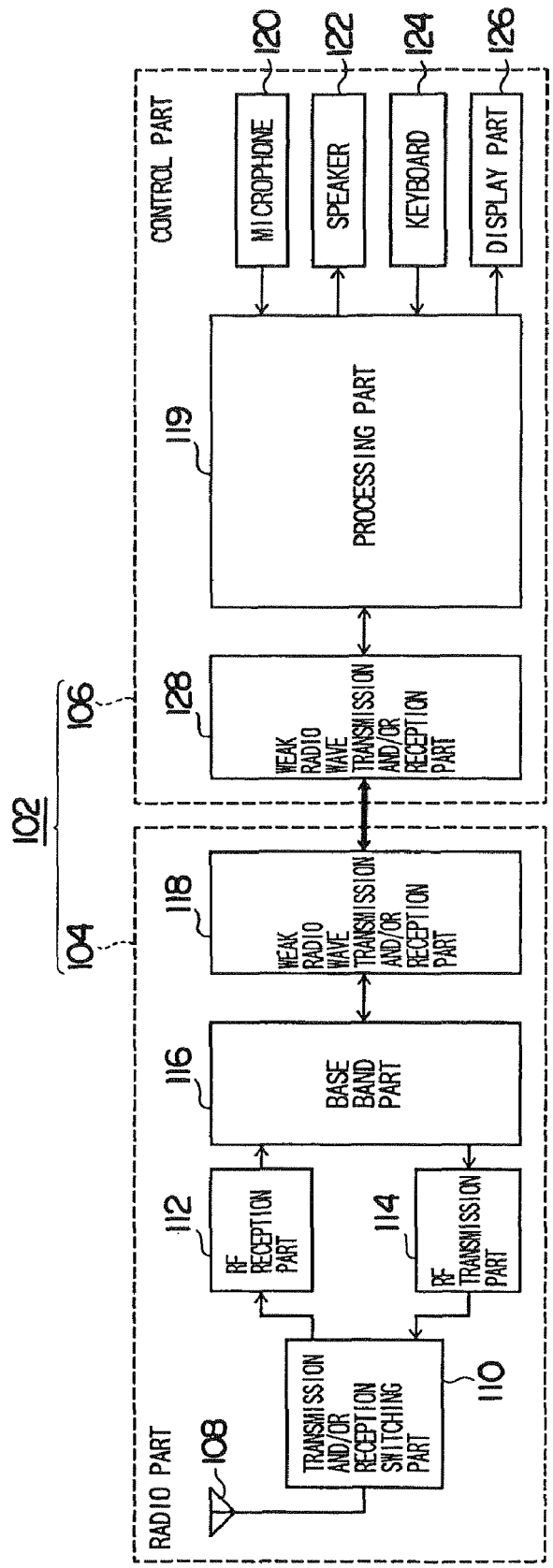
FIG. 2 is a block diagram showing a portable terminal according to a first embodiment of the invention.

A first embodiment of the invention is now described with reference to FIG. 2. FIG. 2 shows a portable terminal according to the first embodiment of the invention. A portable terminal 102 configures as an information processing terminal, for example, a portable telephone, and has a radio part 104 and a control part 106 as a basic configuration wherein the radio part 104 and the control part 106 are configured to function separately. The radio part 104 and control part 106 may be configured to have a function part which can function or can be used separately. For example, the radio part 104 is a function part needed for effecting long-range or short-range communication using a radio wave and so forth as transmission medium, for example, with a telephone using a public circuit and so forth, and the control part 106 is a function part for processing information to be transmitted or received, wherein the function part of the radio part 104 may be included in the control part 106. Accordingly, even if the radio part 4 and the control part 6 are independent functionally from each other according to the conventional portable terminal 2 in FIG. 1, they can merely integrally operate, whereas according to the portable terminal 102 of this embodiment, the radio part 104 and the control part 106 are configured to function separately. The configuration to function or to be used separately means that the radio part 104 and the control part 106 may operate at the same time and it does not mean that only one of the radio part 104 and control part 106 operates.

The radio part 104 is a part for effecting transmission and/or reception of a call signal which uses a radio wave as transmission medium, and comprises an antenna 108, a transmission and/or reception switching part 110, an RF (Radio Frequency) reception part 112, an RF transmission part 114, a base band part 116, a weak radio wave transmission and/or reception part 118, and a control part made up of a CPU and so forth, not shown. That is, the antenna 108, the transmission and/or reception switching part 110, the RF reception part 112, the RF transmission part 114 and the base band part 116 configure a radio communication part, and the weak radio wave transmission and/or reception part 118 configures an information transmission and/or reception part. The antenna 108 is used for effecting transmission and/or reception of an RF signal, and the transmission and/or reception switching part 110 switches the antenna 108 to the RF reception part 112 side when the antenna 108 receives the signal, and switches the antenna 108 to the RF transmission part 114 side when the antenna 108 transmits the RF signal. The RF reception part 112 executes processing of demodulation of a base band signal from the RF signal and so forth, and the RF transmission part 114 executes processing of modulation from the base band signal to the RF signal. The base band part 116 comprises an analog base band processing part and a logic base band processing part, and execute processing of compression, and expansion of a voice signal and synthesis and separation between the voice signal and a control signal and so forth for effecting transmission and/or reception of radio. The weak radio wave transmission and/or reception part 118 is used for effecting transmission and/or reception of various information such as a voice and so forth to be transmitted from the radio part 104 using a weak radio wave as transmission medium separately from the RF signal at the antenna 108 side. The weak radio wave transmission and/or reception part 118 can use various communication system, for example, it can use Bluetooth.

The control part 106 comprises a processing part 119, a microphone 120, a speaker 122, a keyboard 124, a display part 126 and a weak radio wave transmission and/or reception part 128. The processing part 119 has a MPU (Micro Processor Unit), a ROM (Read-Only Memory) and a RAM (Random-Access Memory) and so forth and executes a keyboard control, a voice amplification, a display control and an application control and so forth. The microphone 120 detects a voice signal and converts the voice signal into an electric signal, and inputs the electric signal to the processing part 119, and the speaker 122 converts the electric signal outputted from the processing part 119 into the voice signal. The keyboard 124 is used to input information such as a telephone number and so forth to the processing part 119, and the display part 126 comprises a liquid crystal display and so forth and outputs image information such as characters and so forth. That is, the microphone 120 and the keyboard 124 configure information input part relative to the processing part 119 while the speaker 122 and the display part 126 configure information supply part for supplying voice or character information. The weak radio wave transmission and/or reception part 128 is used for effecting transmission and/or reception of various information such as voice and so forth to be transmitted from the radio part 104 using weak radio wave as transmission medium separately from the RF signal at the antenna 108 side. The weak radio wave transmission and/or reception part 128 can use various communication system corresponding to the weak radio wave transmission and/or reception part 118, for example, it can use Bluetooth.

According to the portable terminal 102 having such an arrangement, the RF signal is received by the RF reception part 112 via the antenna 108, and it is demodulated to the base band signal at the base band part 116, then a voice signal is separated from the base band signal. The voice signal is transmitted from the weak radio wave transmission and/or reception part 118 serving as a transmission part to the weak radio wave transmission and/or reception part 128 through a weak radio wave, and it is supplied to the processing part 119 of the control part 106. The voice signal is subjected to voice amplification and so forth at the processing part 119, which is in turn reproduced as voice by the speaker 122. Information other than the voice is displayed on the display part 126 where it is supplied. Further, each information signal inputted from the keyboard 124 and the microphone 120 is supplied to the weak radio wave transmission and/or reception part 128 via the processing part 119, and they are transmitted to the weak radio wave transmission and/or reception part 118 of the radio part 104 side through the weak radio wave as the transmission medium while the weak radio wave transmission and/or reception part 128 serves as the transmission part. The information signal received by the weak radio wave transmission and/or reception part 118 is reproduced in the weak radio wave transmission and/or reception part 118, and the information signal is converted into the base band signal by the base band part 116, and it is modulated by the RF transmission part 114, and it is transmitted as the RF signal toward a base station via the antenna 108.

With the portable terminal 102 having such an arrangement, the radio part 104 is allowed to function in isolation while separating from the control part 106 in addition to the function as the normal terminal, and also effects transmission and/or reception of information between itself and other same type of portable terminals via the weak radio wave transmission and/or reception part 118 so as to transmit the information from the radio part 104 toward the base station. Further, the control part 106 is allowed to function in isolation while separating from the radio part 104, and can effect transmission and/or reception of information between itself and other same type of portable terminals via the weak radio wave transmission and/or reception part 128, and can transmit the information from the control part 106 toward the base station via the other portable terminals. Further, information received from another portable terminal can be also transmitted from the radio part 104 via the weak radio wave transmission and/or reception parts 118, 128. In such a manner, the portable terminal 102 can realize complex call and data communication associated with another portable terminal in addition to the function as a single normal terminal.

Accordingly, the portable terminal 102 having such an arrangement can effect long-range communication utilizing a public circuit network and so forth by the radio communication part set forth above, and also effect a short-range communication between the portable terminals by the information transmission and/or reception part set forth above, thereby realizing a high convenient portable terminal, and coping with call modes, locations, and portable terminals through which the call is effected, so that the convenience of the portable terminal is enhanced.

Further, with the portable terminal having such an arrangement, it is possible to selectively switch between a communication mode as a normal terminal and other communication modes between itself and other communication terminal on one portable terminal, thereby providing a high convenient portable terminal capable of selecting a desired communication mode.

Still further, since the portable terminal having such an arrangement is provided with the information transmission and/or reception part for effecting transmission and/or reception of information in the radio part for effecting communication by radio and the information transmission and/or reception part for effecting transmission and/or reception of information in the control part for processing information, the portable terminal can effect transmission and/or reception of information between itself and another portable terminal while the radio part and the control part are independent from each other.

Second Embodiment

Figure 3:
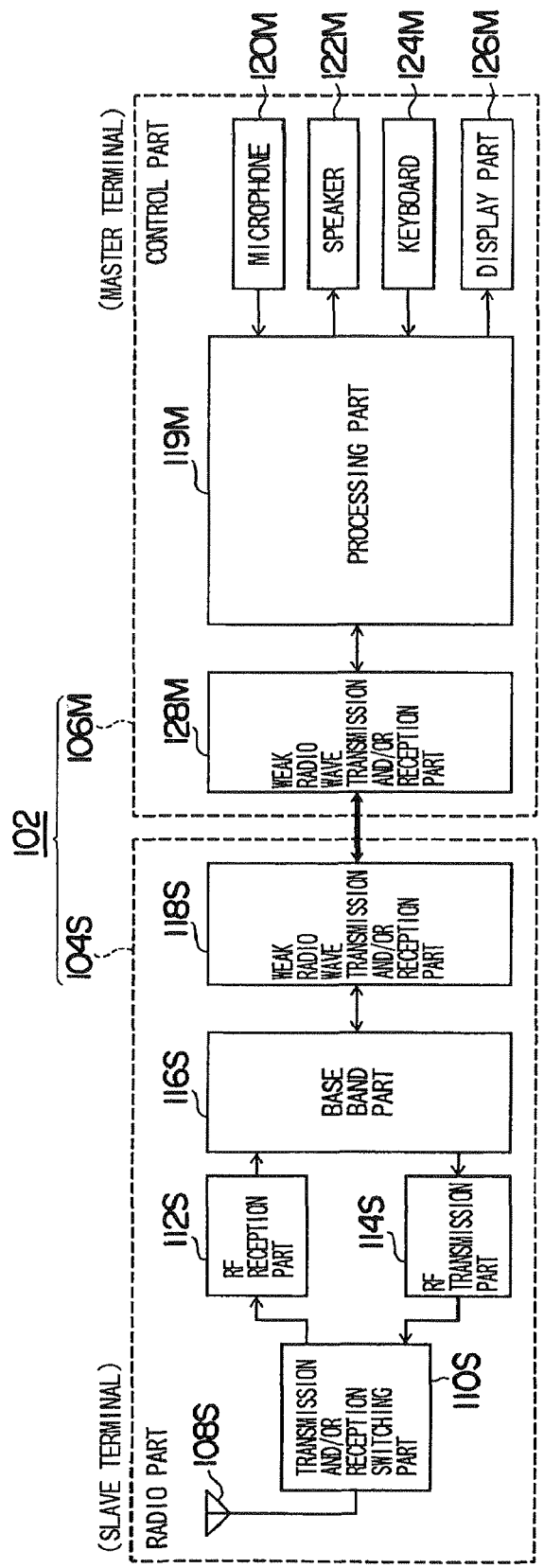
FIG. 3 is a block diagram showing a portable terminal according to a second embodiment of the invention.

A second embodiment of the invention is now described with reference to FIG. 3. FIG. 3 shows a portable terminal according to the second embodiment of the invention. A portable terminal 102 of this embodiment is configured in that a control part 106M serves as a master terminal and a radio part 104S serves as a slave terminal, and these radio part 104S and the control part 106M configure a normal terminal. The other configurations of the second embodiment are the same as those of the first embodiment. That is, according to the second embodiment, the radio part 104S and the control part 106M are configured to function (separately) independently from each other, and the portable terminal 102 is electrically and functionally connected to another portable terminal via respective weak radio wave transmission and/or reception parts 118S, 128M, so that the portable terminal 102 can function as a normal terminal. With such a configuration, the control part 106M serving as the master terminal is connected to a radio part of other same kind of portable terminals to effect transmission and/or reception of information while the radio part 104S serving as the slave terminal connected to the control part of the same type other portable terminal to effect transmission and/or reception of information, thereby facilitating diversification of the communication mode.

Third Embodiment

Figure 4:
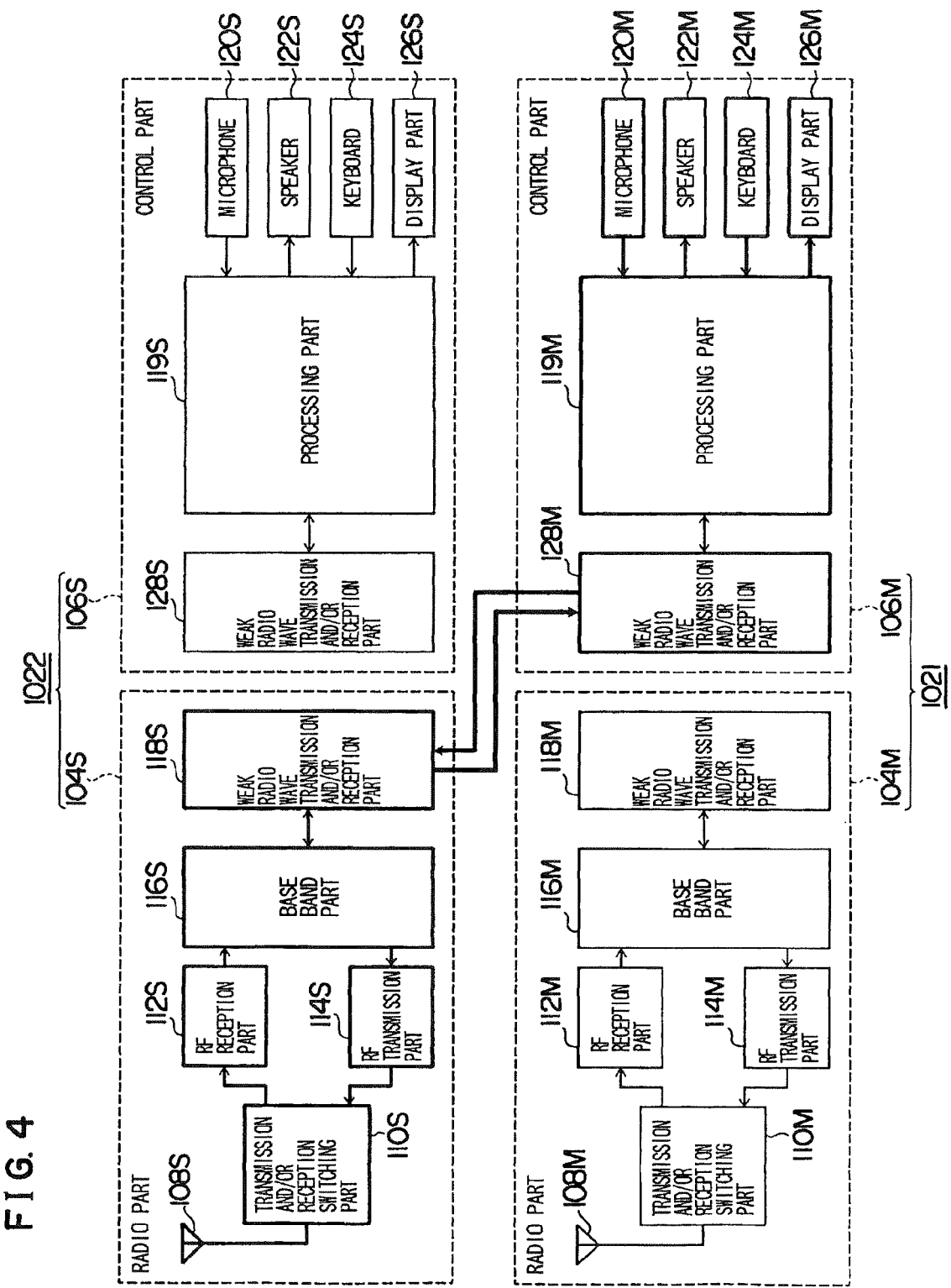
FIG. 4 is a block diagram showing a master slave portable telephone system according to a third embodiment of the invention.

A third embodiment of the invention is now described with reference to FIG. 4. FIG. 4 shows a master slave portable telephone system according to the third embodiment of the invention. The master slave portable telephone system is configured by use of two units of portable terminals 1021, 1022 serving as a plurality of portable terminals. According to this embodiment, the portable terminal 1021 is present at the master side and the portable terminal 1022 is present at the slave side, and the configurations of the portable terminals 1021, 1022 are basically the same as the portable terminal 102 shown in FIG. 2.

According to two units of portable terminals 1021, 1022 having such a configuration, assuming that a radio part 104S of the portable terminal 1022 at the slave side and a control part 106M of the portable terminal 1021 at the master side are allowed to function and a weak radio wave transmission and/or reception part 128M and a weak radio wave transmission and/or reception part 118S are connected to each other via weak radio wave, one portable terminal is made up of the radio part 104S at the portable terminal 1022 side and the control part 106M at the portable terminal 1021 side. Even with the portable terminal of the master slave, as set forth above, information signals which are inputted from a keyboard 124M or a microphone 120M of the portable terminal 1021 at the master side are supplied to the weak radio wave transmission and/or reception part 128M via a processing part 119M, and they are transmitted from the weak radio wave transmission and/or reception part 128M to the weak radio wave transmission and/or reception part 118S of the radio part 104S of the portable terminal 1022 at the slave side thorough the weak radio wave serving as the transmission medium. The information signal which is received and reproduced by the weak radio wave transmission and/or reception part 118S is supplied to the base band part 116S, where the information signal such as voice and so forth is converted into a base band signal, then the converted base band signal is modulated by the RF transmission part 114S and is transmitted from the antenna 108S as an RF signal. Further, the base band signal is demodulated from the RF signal which is received by the RF reception part 112S via the antenna 108S at the radio part 104S at the slave side, and a voice signal which is separated from the base band signal is transmitted from the weak radio wave transmission and/or reception part 118S serving as a transmission part to the weak radio wave transmission and/or reception part 128M thorough the weak radio wave, where it is reproduced, then the reproduced signal is supplied to the processing part 119M of the control part 106M at the master side, where it is subjected to process of voice amplification and so forth and is reproduced as voice by the speaker 122M. Regarding information other than voice, various information such as character information and so forth are displayed on the display part 126M where it is supplied.

In this case, even if the control part 106S of the portable terminal 1022 at the slave side and the radio part 104M of the portable terminal 1021 at the master side are allowed to function and the weak radio wave transmission and/or reception part 128S and the weak radio wave transmission and/or reception part 118M are connected to each other by weak radio wave to configure the portable terminal, transmission processing of voice and so forth can be similarly executed.

If such a master slave portable telephone system is used, the function of the portable terminals can be enhanced by combining the functions thereof using a high-function portable terminal of a new communication system in the portable terminals 1021 and 1022. High functions such as a mass data communication, a high image quality display, a high grade sound quality and so forth can be used, for example, by the combination of high-function portable terminals, and the combination of a high-function portable terminal and a portable terminal having a normal function, thereby realizing a high grade communication even at an area where the number of base stations is small, and a weak electric field zone. Further, even if a portable terminal of a conventional communication system is used in the portable terminals 1021, 1022, functions of a call and data communication can be enhanced.

If the portable terminal can be configured by the portable terminals 1021, 1022 as set forth above, one portable terminal can realize a normal portable terminal capable of making a normal call by one portable terminal, a master terminal having a master function, and a slave terminal having a slave function, and the master slave system can be configured independently by the normal terminal and not less than two portable terminals, so that high function such as mass data communication, high image quality display, high grade sound quality and so forth can be utilized by the combination of high-function portable terminals and the combination of high quality portable terminal and the portable terminal having a normal function, thereby realizing a high grade communication even at an area where the number of base stations is small, and a weak electric field zone. A portable terminal having low function and a high-function portable terminal can be used together compared with the high-function portable terminal, so that downsizing with light weight, high function, high sensitivity, or low current consumption provided with the master slave function can be realized.

According to this embodiment, although the master slave portable telephone system is configured by use of the portable terminal 102 (first embodiment) shown in FIG. 2, the same master slave function can be realized even by use of the portable terminal 102 (second embodiment) made up of the control part 106M (master terminal) and the radio part 104S (slave terminal) as shown in FIG. 3 in the portable terminals 1021, 1022.

Fourth Embodiment

Figure 5:
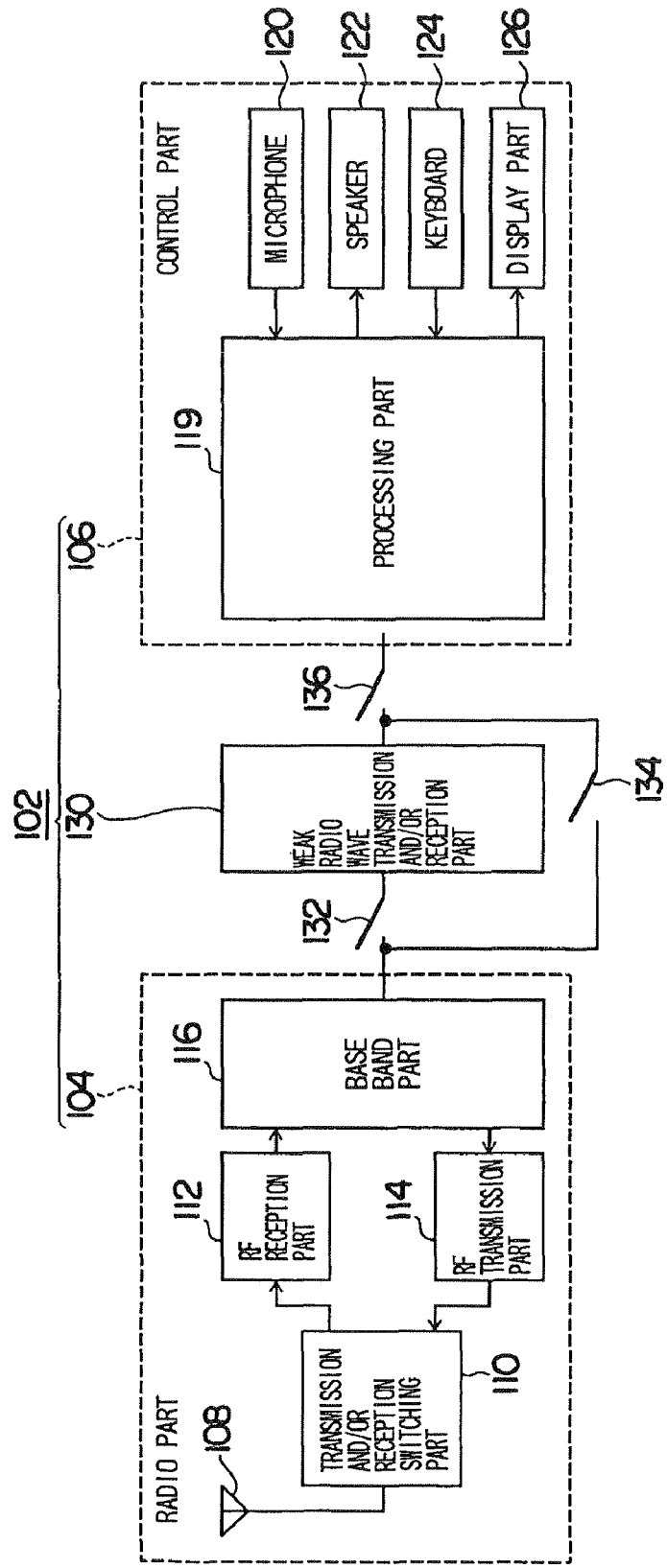
FIG. 5 is a block diagram showing a portable terminal according to a fourth embodiment of the invention.

A fourth embodiment of the invention is next described with reference to FIG. 5. FIG. 5 shows a portable terminal according to the fourth embodiment of the invention. A portable terminal 102 is provided with a radio part 104 and a control part 106 as a basic configuration, and the radio part 104 and control part 106 are configured to function separately and independently from each other but according to the fourth embodiment, first, second and third switches 132, 134, 136 are installed as switching part together with a single weak radio wave transmission and/or reception part 130 which is used in common by the radio part 104 and the control part 106. The switch 132 is installed between a base band part 116 and the weak radio wave transmission and/or reception part 130, the switch 134 is installed while bridging over the switch 132 and the weak radio wave transmission and/or reception part 130 and the switch 136 is installed between the weak radio wave transmission and/or reception part 130 and a processing part 119. Accordingly, according to the portable terminal 102, a first communication mode is established by closing the switch 134 and the switch 136, and the base band part 116 and the processing part 119 are connected to each other via the switch 134 and the switch 136, thereby configuring a normal terminal.

A second communication mode is established by closing the switch 136 and opening the switches 132, 134, and in such a second communication mode, the weak radio wave transmission and/or reception part 130 is connected to the processing part 119 so that the control part 106 can be connected to another portable terminal by way of the weak radio wave transmission and/or reception part 130. Further, a third communication mode is established by closing the switch 132 and opening the switches 134, 136, and in such a third communication mode, the weak radio wave transmission and/or reception part 130 is connected to the base band part 116 so that the radio part 104 can be connected to another portable terminal by way of the weak radio wave transmission and/or reception part 130.

Figure 6:
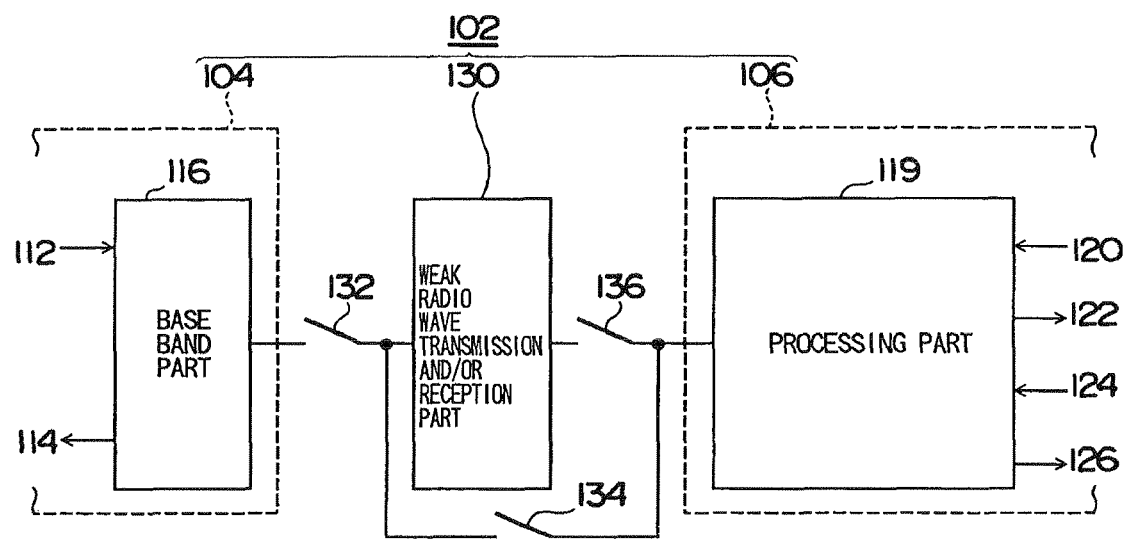
FIG. 6 is a block diagram showing a modified example of the portable terminal according to the fourth embodiment of the invention.
Figure 7:
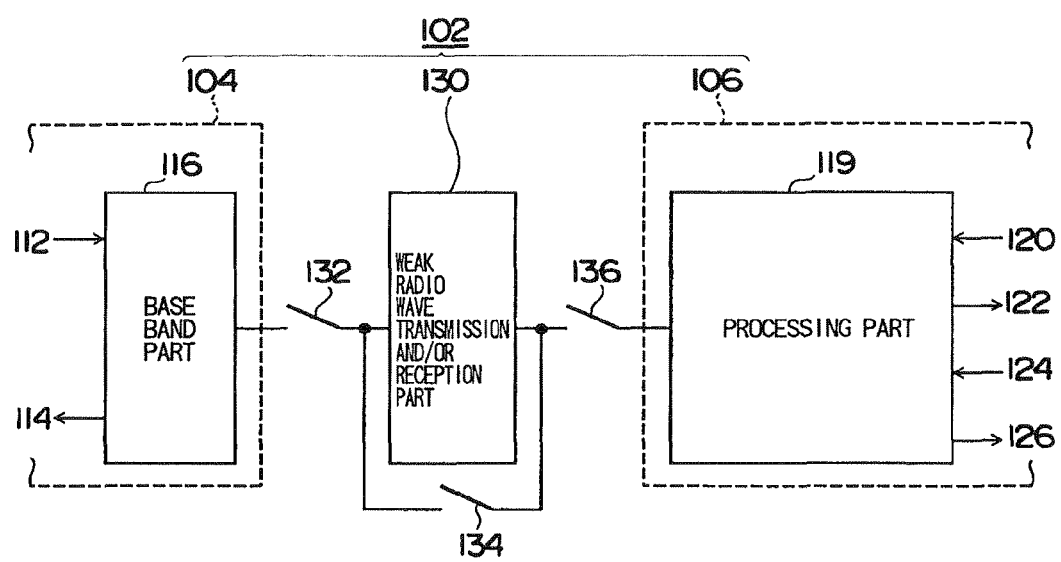
FIG. 7 is a block diagram showing another modified example of the portable terminal according to the fourth embodiment of the invention.

In this embodiment, the switch 134 may be installed while bridging over the weak radio wave transmission and/or reception part 130 and the switch 136 as shown in FIG. 6, and in this case, if the normal terminal serving as the first communication mode is configured, it is sufficient that the switches 132, 134 are closed. Still further, the switch 134 may be installed while bridging over the only the weak radio wave transmission and/or reception part 130, for example, as shown in FIG. 7, and in this case, if the normal terminal serving as the first communication mode is configured, it is sufficient that all the switches 132, 134, 136 are closed.

As mentioned above, if the portable terminal is configured by providing both the radio communication part and information processing part by combining them or a switching part for combining information transmission and/or reception part to the radio communication part or information processing part is installed, the single information transmission and/or reception part can be shared by the radio communication part and information processing part, thereby simplifying the configuration of the portable terminal which is subjected to the master slave.

Fifth Embodiment

Figure 8:
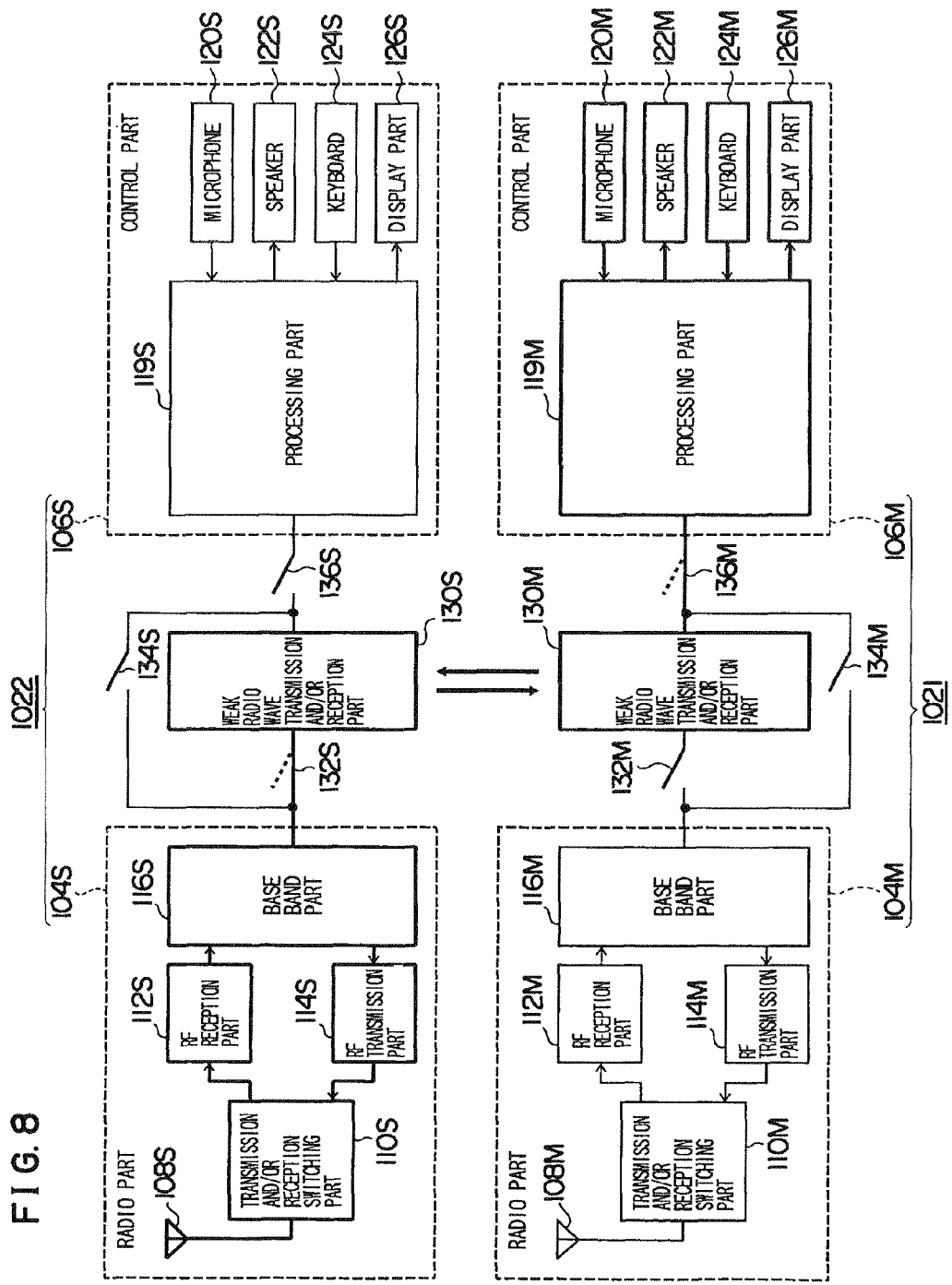
FIG. 8 is a block diagram showing a master slave portable telephone system according to a fifth embodiment of the invention.

A fifth embodiment of the invention is next described with reference to FIG. 8. FIG. 8 shows a master slave portable telephone system according to the fifth embodiment of the invention. According to the master slave portable telephone system, it is configured by portable terminals 1021, 1022 at a master side and a slave side each using the portable terminal 102 of the fourth embodiment, wherein the portable terminals 1021, 1022 are the same as the portable terminal 102 shown in FIG. 5.

With two units of portable terminals 1021, 1022 having such a configuration, a radio part 104S of the portable terminal 1022 at the slave side and a control part 106M of the portable terminal 1021 at the master side are operated respectively, and a weak radio wave transmission and/or reception part 130S is connected to a base band part 116S by closing a switch 132S, thereby allowing the slave side to be a third communication mode, while if a weak radio wave transmission and/or reception part 130M is connected to a processing part 119M by closing a switch 136M to allow the master side to be a second communication mode, the weak radio wave transmission and/or reception parts 130S, 130M are connected to each other thorough the weak radio wave, so that one portable terminal is configured by the radio part 104S of the portable terminal 1022 side and the control part 106M of the portable terminal 1021 side via the connection between the weak radio wave transmission and/or reception parts 130S, 130M.

In this case, as set forth above, information signals inputted from a keyboard 124M and a microphone 120M of the portable terminal 1021 at the master side are supplied to the weak radio wave transmission and/or reception part 130M via the processing part 119M and they are transmitted from the weak radio wave transmission and/or reception part 130M to the weak radio wave transmission and/or reception part 130S of the portable terminal 1022 at the slave side through the weak radio wave serving as the transmission medium. The information signal which is received and reproduced by the weak radio wave transmission and/or reception part 130S is converted into a base band signal by the base band part 116S and is modulated by the RF transmission part 114S, and it is transmitted from the antenna 108S as an RF signal. Meanwhile, the RF signal which is received by the RF reception part 112S via the antenna 108S of the radio part 104S at the slave side is demodulated to the base band signal, and a voice signal separated from the base band signal is transmitted from the weak radio wave transmission and/or reception part 130S serving as a transmission part to the weak radio wave transmission and/or reception part 130M through the weak radio wave, then the information signal such as voice and so forth is reproduced, thereafter it is supplied to the processing part 119M of the control part 106M at the master side, and finally it is subjected to processing of voice amplification and so forth to be reproduced as voice by the speaker 122M. Regarding information other than voice, various information such as character information and so forth is displayed on the display part 126M where it is supplied.

In this case, if the control part 106S of the portable terminal 1022 at the slave side and the radio part 104M of the portable terminal 1021 at the master side are operated by closing the switches 132M, 136S and the weak radio wave transmission and/or reception part 130S is connected the processing part 119 side, thereby allowing the slave side to be a second communication mode, and the weak radio wave transmission and/or reception part 130M is connected to the radio part 104M side, thereby allowing the master side to be a third communication mode, then the weak radio wave transmission and/or reception part 130S and weak radio wave transmission and/or reception part 130M are connected to each other through the weak radio wave, thereby forming the portable radio terminal, process of transmission of voice and so forth can be similarly effected.

Further, with the master slave portable telephone system, if the configuration of switches at the master side and slave side is configured by the switches as shown in FIG. 6 or 7, instead of the switches 132M, 134M, 136M, 132S, 134S, 136S as shown in FIG. 8, and the same master slave function can be obtained.

Sixth Embodiment

Figure 9:
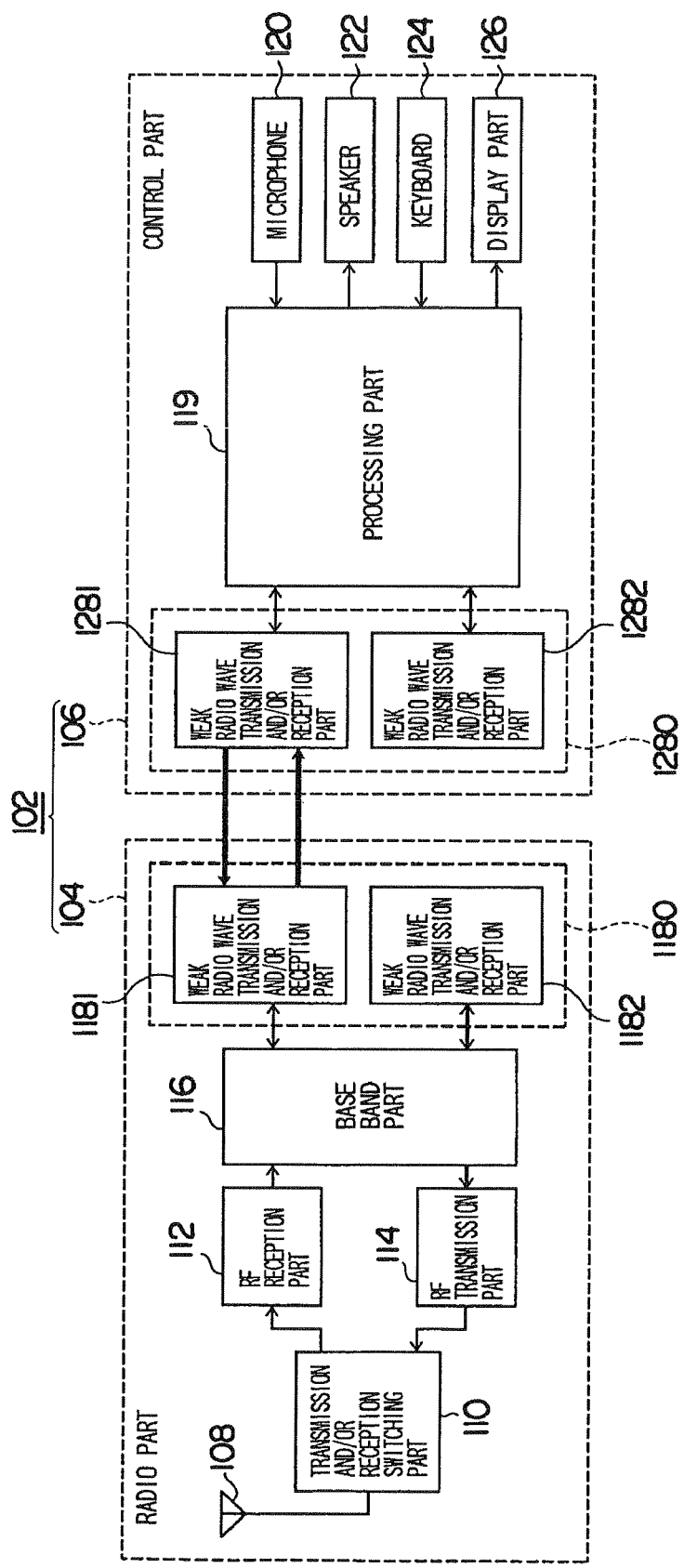
FIG. 9 is a block diagram showing a portable terminal according to a sixth embodiment of the invention.

A sixth embodiment of the invention is described next with reference to FIG. 9. FIG. 9 shows a portable terminal according to the sixth embodiment of the invention. A portable terminal 102 of this embodiment is provided with a radio part 104 and a control part 106 as a basic configuration and these radio part 104 and control part 106 are configured to function separately and independently from each other, wherein first and second weak radio wave transmission and/or reception parts 1181, 1182 as a plurality of weak radio wave transmission and/or reception parts are installed in an information transmission and/or reception part 1180 at the radio part 104 side, while first and second weak radio wave transmission and/or reception parts 1281, 1282 as a plurality of weak radio wave transmission and/or reception parts are installed in an information transmission and/or reception part 1280 at the control part 106 side. With the portable terminal 102 having such a configuration, either the weak radio wave transmission and/or reception part 1181 or 1182 is connected to either the weak radio wave transmission and/or reception part 1281 or 1282 through the weak radio wave, thereby configuring a normal portable terminal so that a call and transmission processing of information can be executed as the master terminal, the slave terminal or the normal terminal as set forth above.

With the portable terminal having such an arrangement, since the radio part is provided with the first and second information transmission and/or reception part, described above, for effecting transmission and/or reception of information and the control part is provided with the first and second information transmission and/or reception part for effecting transmission and/or reception of information, the normal terminal is configured by combining the radio part with the control part using the first information transmission and/or reception part, enhancing multi-function of the portable terminal such that the portable terminal can effect transmission and/or reception of information relative to another portable terminal using the second information transmission and/or reception and so on, thereby effecting a complex call and transmission and/or reception of information.

Figure 10:
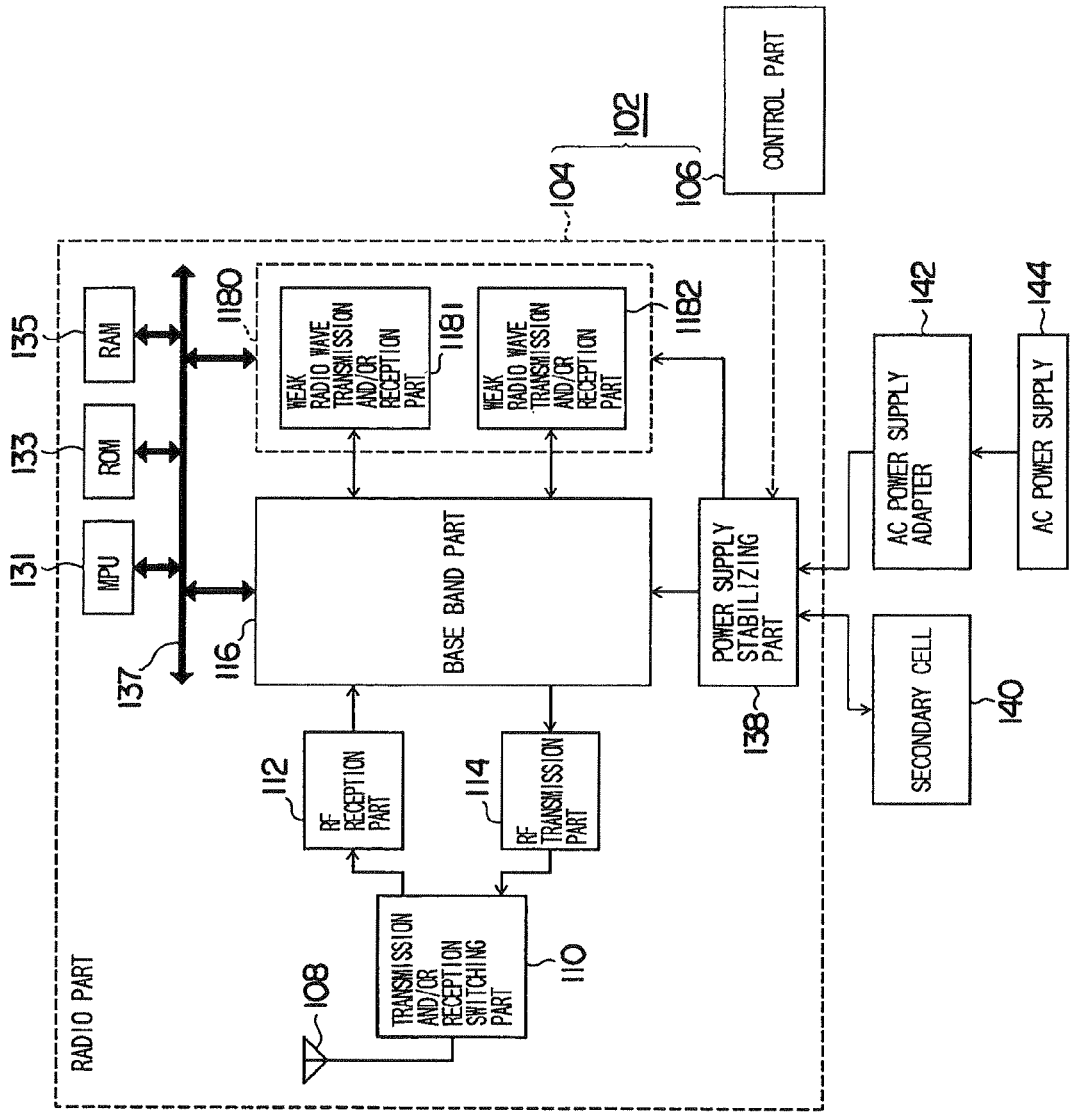
FIG. 10 is a block diagram showing an example of a radio part of the portable terminal according to the sixth embodiment of the invention.
Figure 11:
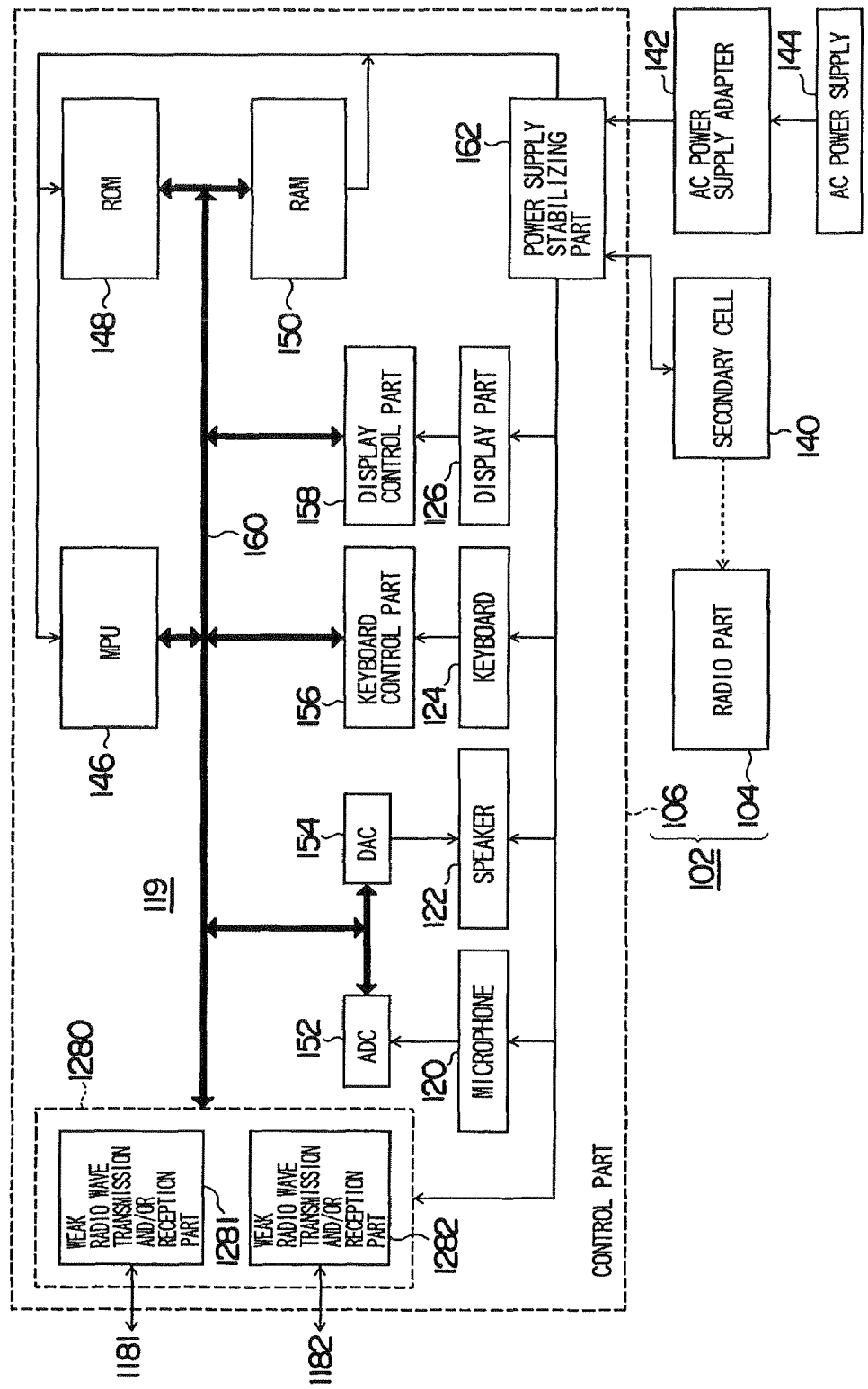
FIG. 11 is a block diagram showing an example of a control part of the portable terminal according to the sixth embodiment of the invention.

A configuration example of the sixth embodiment is now described with reference to FIGS. 10 and 11. FIG. 10 shows an example of the radio part of the portable terminal according to the sixth embodiment of the invention, and FIG. 11 shows an example of the control part of the portable terminal according to the sixth embodiment of the invention. According to this embodiment, the components which are the same as those shown in FIG. 9 is depicted by the same reference numerals and the explanation thereof is omitted.

As shown in FIG. 10, an MPU 131 serving as a control part, a ROM 133, a RAM 135 and so forth serving as a storage part respectively are formed in the radio part 104, and these MPU 131, ROM 133, RAM 135 are linked with a base band part 116 and an information transmission and/or reception part 1180 and so forth by way of a bus 137. The MPU 131 executes selection, control and so forth of the weak radio wave transmission and/or reception parts 1181, 1182 when effecting transmission and/or reception of weak radio wave according to a control program stored in the ROM 133. A power supply stabilizing part 138 is installed in the radio part 104, and it generates a predetermined voltage and configures a cell charge control part. A fixed direct voltage is applied from a secondary battery 140, an AC (alternating current) power supply adapter 142 or the control part 106 (FIG. 9) to the power supply stabilizing part 138. The secondary cell 140 is a battery which can be charged and discharged repetitively and configured as a power supply of the radio part 104. The AC power supply adapter 142 is AC-DC converter, and is connected to an AC power supply 144 for converting the AC into the DC to generate a fixed DC voltage, and it also serves as a power supply of the radio part 104 and configures a charger of the secondary cell 140. The power supply stabilizing part 138 generates a fixed voltage upon receipt of the fixed voltage from the secondary cell 140, the AC power supply adapter 142 or control part 106 side, and the fixed voltage is applied to the base band part 116, the weak radio wave transmission and/or reception part 1181 or 1182, and so forth. In this case, the secondary cell 140 and the AC power supply adapter 142 serving as the charger may be shared with the control part 106 (FIG. 11).

Further, as shown in FIG. 11, the information transmission and/or reception part 1280 and the processing part 119 are installed in the control part 106, as set forth above, and the weak radio wave transmission and/or reception part 1280 is configured by the information transmission and/or reception parts 1281, 1282. An MPU 146 serving as an information processing part, a ROM 148 and a RAM 150 serving as a storage section, an ADC (Analog Digital Converter) 152 for converting an input signal of a microphone 120 into a digital signal, a DAC (Digital Analog Converter) 154 for converting an output signal of the MPU 146 relative to the speaker 122 into an analog signal, a keyboard control part 156 for taking therein information input from a keyboard 124 into the MPU 146, and a display control part 158 for driving a display part 126 by display output of the MPU 146 are installed in the processing part 119, respectively, and these elements are linked with one another by a bus 160. Further, a power supply stabilizing part 162 serving as a power supply port is installed in the processing part 119. The power supply stabilizing part 162 is a part for generating a predetermined voltage, and it configures a cell charge control part, wherein a fixed DC voltage which is generated in the power supply stabilizing part 162 serving as a power supply part is supplied to the microphone 120, the speaker 122, the keyboard 124, the display part 126, the ROM 148 and the RAM 150 each serving as function part, respectively.

According to this embodiment, a fixed DC voltage is applied from the secondary cell 140 and the AC power supply adapter 142 to the power supply stabilizing part 162. Further, the secondary cell 140 and the AC power supply adapter 142 which are common to the radio part 104 shown in FIG. 10 are employed in this embodiment. In this case, the secondary cell and the AC power supply adapter may be installed separately from the radio part 104.

Figure 12:
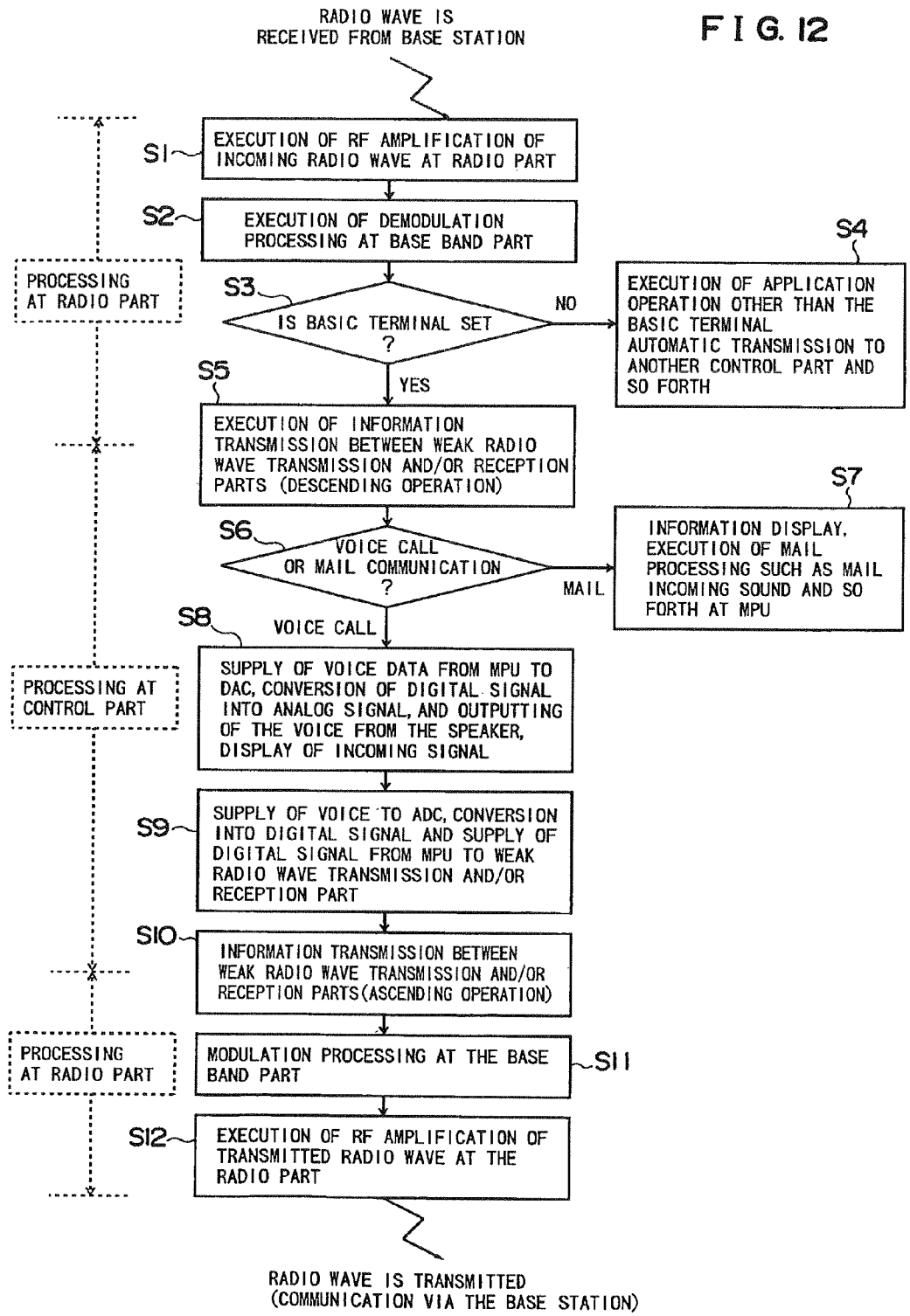
FIG. 12 is a flow chart showing processing of the portable terminal according to the sixth embodiment of the invention.

A communication processing in the portable terminal 102 according to this embodiment is now described with reference to FIG. 12. FIG. 12 is a flowchart showing a normal processing of the portable terminal.

Upon receipt of a radio wave from a base station, not shown, the RF reception part 112 of the radio part 104 executes an RF amplification of a incoming radio wave (step S1), and the base band part 116 executes a demodulation processing of a base band signal (step S2), the MPU 131 executes a decision whether the basic terminal (normal terminal) is set or not (step S3), application operation other than the basic terminal (normal terminal) is executed if the basic terminal is not set, for example, an automatic transmission processing to a portable terminal side, not shown, is executed (step S4), and if the basic terminal is set, information transmission is effected, for example, between the weak radio wave transmission and/or reception parts 1181, 1281 (step S5). The transmission of the information is descending operation and a processing from the receipt of the incoming radio wave via the antenna 108 to a transmission of the weak radio wave transmission and/or reception part 1181 is executed inside the radio part 104 (steps S1 to step S5).

When the weak radio wave transmission and/or reception part 1281 receives data from the weak radio wave transmission and/or reception part 1181, the MPU 146 decides as to whether the received data is a voice call or mail communication (step S6), and if the received data is mail communication, information is supplied to the display part 126, and a mail incoming sound is allowed to generate in the speaker 122 to execute mail processing (step S7). If the received data is the voice call, its voice data is supplied from the MPU 146 to the DAC 154 where the digital signal is converted into the analog signal, and the voice is outputted from the speaker 122, and at the same time, an incoming signal display is effected on the display part 126 (step S8). At this time, the voice detected by the microphone 120 is supplied to the ADC 152 where it is converted into the digital signal and it is captured in the MPU 146, and supplied from the MPU 146 to the weak radio wave transmission and/or reception part 1281 as voice data (step S9). The voice data is subjected to information transmission between the weak radio wave transmission and/or reception part 1281 and the weak radio wave transmission and/or reception part 1181 at the radio part 104 side (step S10), and the transmission of this information is an ascending operation. That is, a processing from the receiving processing of the weak radio wave transmission and/or reception part 1281 to the transmission processing of the weak radio wave transmission and/or reception part 1281 is executed inside the control part 106 (step S5 to step S10).

The voice data received by the weak radio wave transmission and/or reception part 1181 is processed as the base band signal through a modulation processing by the base band part 116 of the radio part 104 (step S11), and it is converted into an RF signal by the RF transmission part 114 and amplified therein, thereafter, the transmitted radio wave passes via the transmission and/or reception switching part 10, and is transmitted toward the base station from the antenna 108 (step S12). As a result, the transmission with a portable terminal, not shown, is effected. The processing from the receipt of radio wave by the weak radio wave transmission and/or reception part 1181 of the radio part 104 to transmission of radio wave by the antenna 108 is effected in the radio part 104 (step S10 to step S12).

Seventh Embodiment

Figure 13:
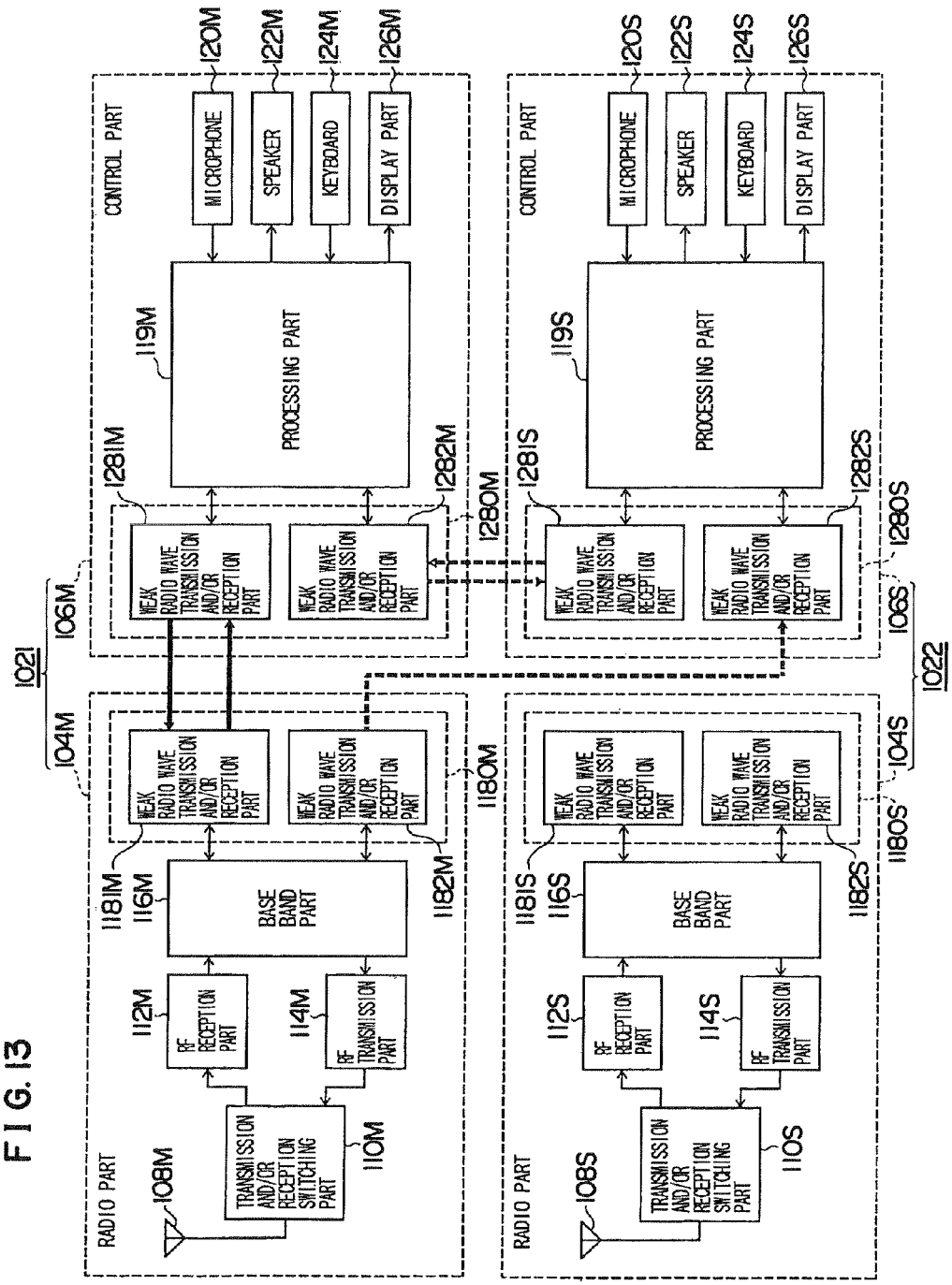
FIG. 13 is a block diagram showing a master slave portable telephone system according to a seventh embodiment of the invention.

A seventh embodiment of the invention is described next with reference to FIG. 13. FIG. 13 shows a master slave portable telephone system according to the seventh embodiment of the invention. According to the master slave portable telephone system, the portable terminal 102 of the sixth embodiment is used in the portable terminals 1021, 1022 at master and slave sides to configure the master slave portable telephone system, wherein the portable terminals 1021, 1022 are the same as the portable terminal 102 as illustrated in FIGS. 9, 10 and 11. In this case, the portable terminal 1022 serving as the slave terminal is a high-function terminal corresponding to, for example, a W-CDMA system, and is capable of effecting transmission and/or reception and processing of large capacity and high-function information such as image data and so forth.

Figure 14:
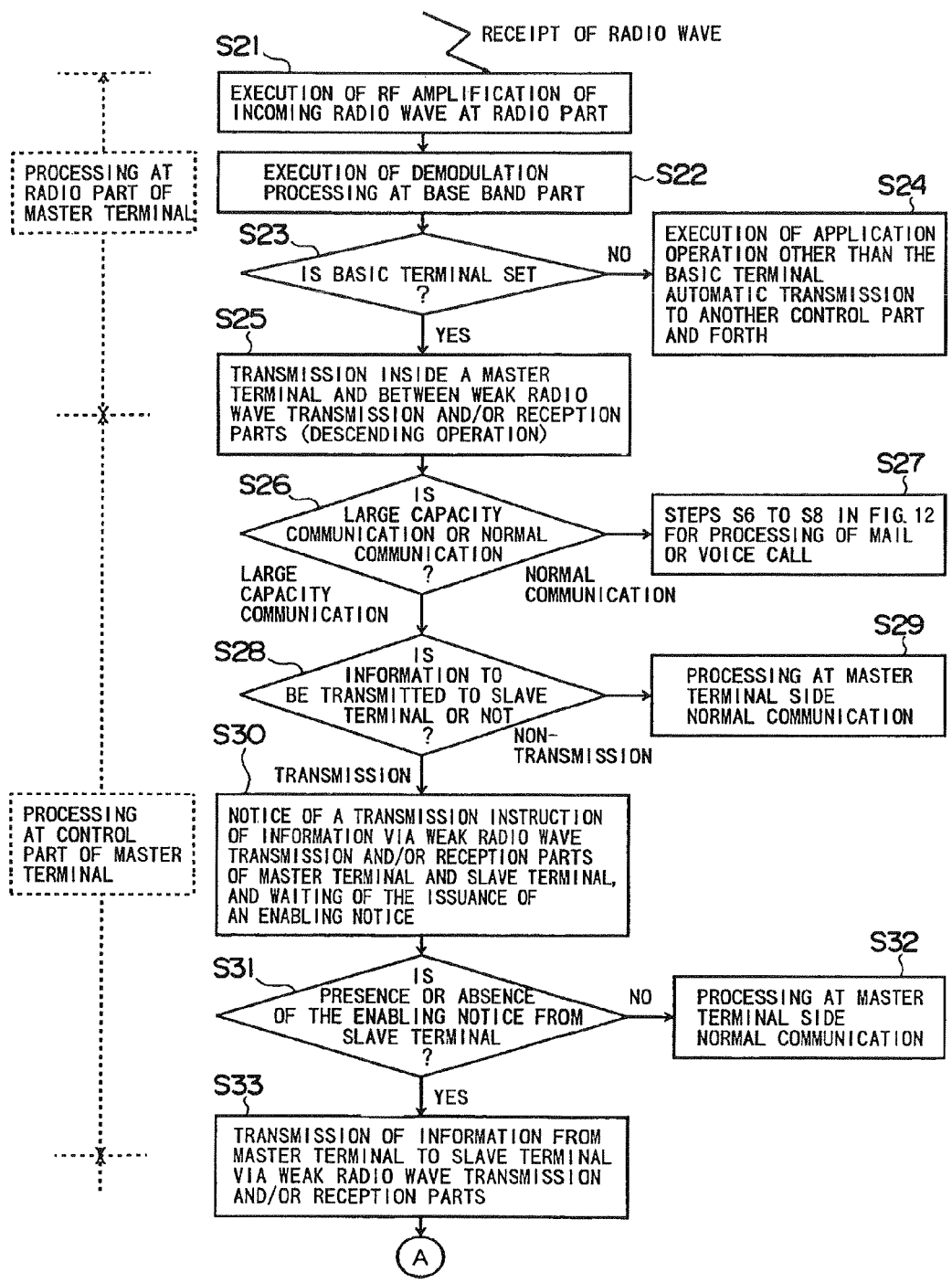
FIG. 14 is a flow chart showing processing of the master slave portable telephone system according to the seventh embodiment of the invention.
Figure 15:
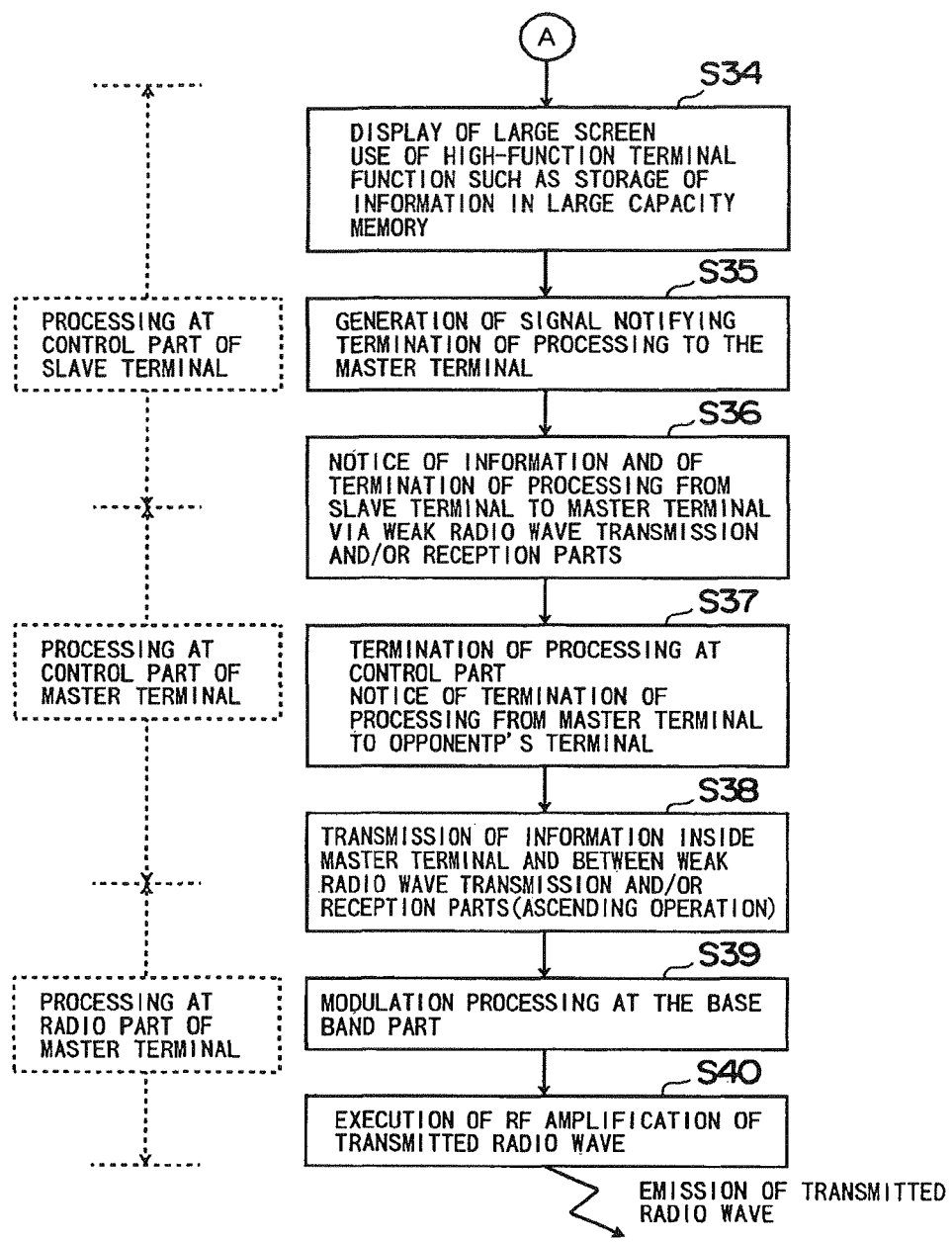
FIG. 15 is a flow chart showing processing of the master slave portable telephone system according to the seventh embodiment of the invention.

A communication processing of the master slave portable telephone system according to this embodiment is now described with reference to FIGS. 14 and 15. FIGS. 14 and 15 are flow charts showing a processing of the master slave portable telephone system, wherein depicted by A shows a connection symbol of each flowchart.

According to this embodiment, transmission and/or reception of large capacity data and information processing are effected by use of the portable terminal 1021 serving as the master terminal and a control part 106S of the portable terminal 1022 serving as the slave terminal. When incoming radio wave is received by a radio part 104M of the portable terminal 1021, an RF reception part 112M amplifies an RF signal (step S21), and a base band part 116M demodulates the RF signal to a base band signal, and information signal such as voice and so forth is demodulated from the base band signal (step S22), and an MPU 131 (FIG. 10) decides as to whether the portable terminal 1021 is set as a basic terminal (normal terminal) or not (step S23). In this case, information as to whether the portable terminal 1021 is set as the basic terminal or not is set in the radio part 104M in a stand-by mode, and the setting information is stored in a RAM 135.

If the portable terminal 1021 is not set as the basic terminal, the information signal is transmitted, for example, to a control part 106S of the portable terminal 1022 as an application processing (step S24). In this case, the information signal is captured in a processing part 119S via a weak radio wave transmission and/or reception part 1182M and weak radio wave transmission and/or reception part 1282S. In this case, although the case where the information is captured in the control part 106S is exemplified, the information may be captured in another portable terminal.

If the portable terminal 1021 is set as the basic terminal, information transmission (descending operation) from the radio part 104M to the control part 106M is effected via the weak radio wave transmission and/or reception parts 1181M, 1281M (step S25), and the processing part 119 decides as to whether the information transmission is large capacity communication or normal communication (step S26). In the case of the normal communication, it is mail or a voice call (step S27), and in this case, the processing in step S6 and subsequent steps shown in the flowchart in FIG. 12 are executed (step S6 to step S8 in FIG. 12).

In the case of large capacity communication, the processing part 119M decides as to whether information is to be transmitted or not to the portable terminal 1022 serving as a high-function terminal at the slave terminal side (step S28), and in the case where the information is not transmitted, the control part 106M at the portable terminal 1021 side executes the processing (step S29). That is, as a result of decision by the MPU 146 of the control part 106 as to whether the information transmission is normal communication or large capacity communication, and if it is not large capacity communication, a processing is executed as the normal terminal.

In the case of transmission of data, a transmission instruction of information is transmitted to the processing part 119S of the portable terminal 1022 side via the weak radio wave transmission and/or reception parts 1282M and 1281S, and the control part 106S waits for the issuance of an enabling notice from the processing part 119S (step S30). The processing part 119M decides the presence or absence of the enabling notice from the processing part 119S at the portable terminal 1022 side (step S31), and in the case where no enabling notice is obtained, the control part 106M at the portable terminal 1021 side executes the processing (step S32). In this case, it is the normal terminal processing serving as the basic terminal.

If the enabling notice is issued from the processing part 119S at the portable terminal 1022 side to the portable terminal 1021 side, information signal is transmitted from the weak radio wave transmission and/or reception part 1182M of the radio part 104M at the portable terminal 1021 side to the weak radio wave transmission and/or reception part 1282S, thereby executing the transmission of information (step S33).

The transmitted information is displayed on a large screen of a display part 126S at the portable terminal 1022 side, and it is stored in the RAM 150 (FIG. 11) constituting the large capacity memory of the processing part 119S (step S34), thereby using high-function terminal function. Upon termination of this processing, a signal representing a termination of the processing is generated in the processing part 119S (step S35). The termination signal is transmitted to the processing part 119M via the weak radio wave transmission and/or reception parts 1281S, 1282M, then the termination of the processing is notified (step S36). The termination of the processing is notified from the radio part 104M of the portable terminal 1021 serving as the master terminal to the opponent's terminal serving as another portable terminal (step S37). In this case, information such as data representing termination of the processing of the control part 106M is transmitted to the radio part 104M via the weak radio wave transmission and/or reception parts 1281M, 1181M (ascending operation (step S38). In the radio part 104M, modulation processing is executed at the base band part 116M (step S39), then the base band is subjected to RF amplification and so forth at the RF transmission part 114, then it is transmitted from the radio part 104M to the base station as a transmission radio wave, and it is notified to the opponent's terminal (step S40).

Eighth Embodiment

Figure 16:
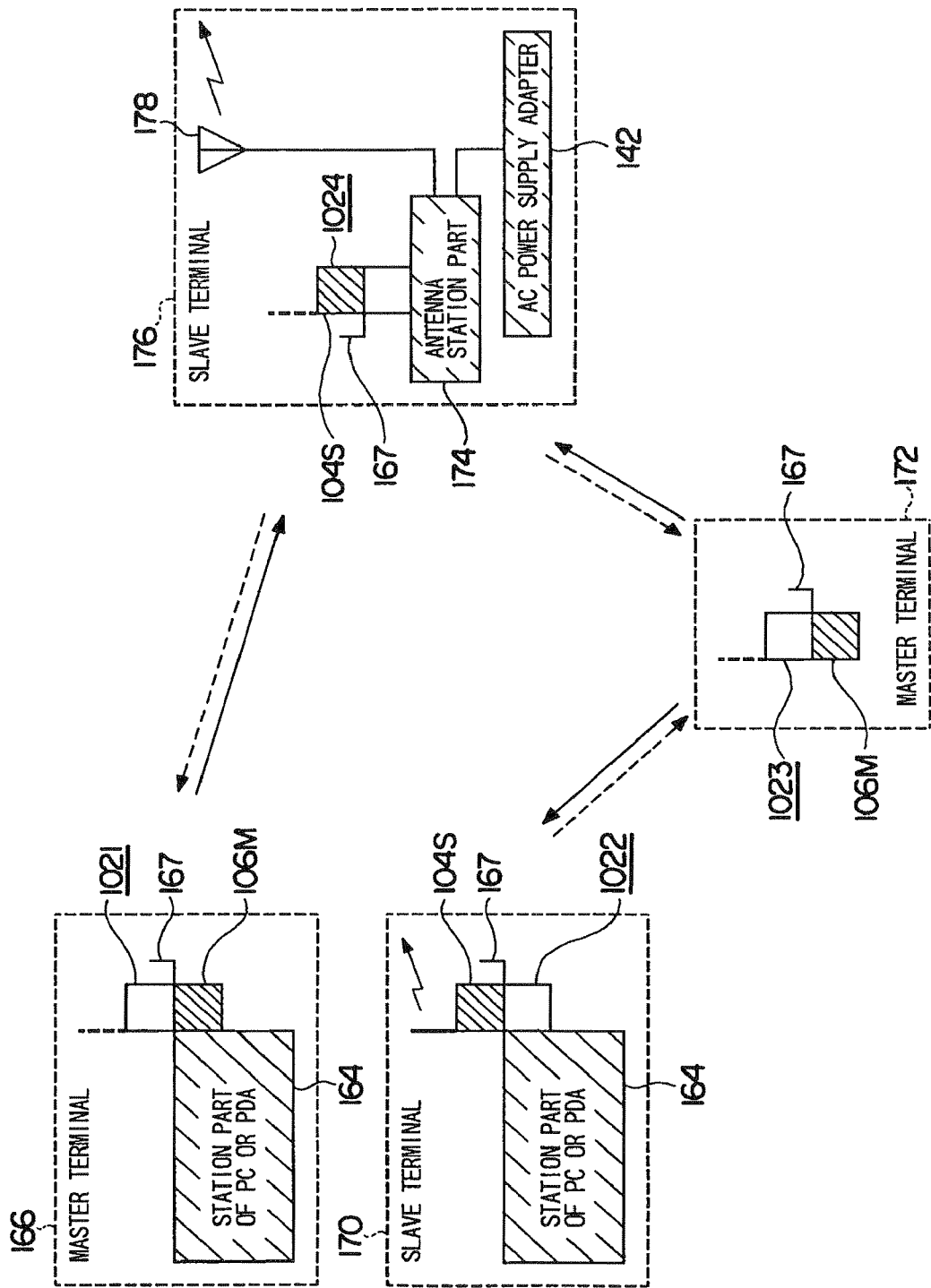
FIG. 16 is a block diagram showing a master slave portable telephone system according to an eighth embodiment of the invention.

An eighth embodiment of the invention is described next with reference to FIG. 16. FIG. 16 shows a master slave portable telephone system according to the eighth embodiment of the invention.

According to the this embodiment, the master slave portable telephone system is configured by a plurality of portable terminals 1021, 1022, 1023, 1024, which are respectively within communication range of the weak radio wave transmission and/or reception part. The portable terminal 1021 is installed in a station part 164 of a PC or PDA and a master terminal 166 is configured to allow a control part 106M alone to function. In this case, transmission and/or reception of weak radio wave at the weak radio wave transmission and/or reception part 128M of the control part 106M (FIG. 3) is effected via an antenna 167. A charger of a secondary cell inside the portable terminal 1021 is built in the station part 164.

Further, the portable terminal 1022 is installed in a station part 164 of the PC or PDA and a slave terminal 170 is configured to allow a radio part 104S alone to function. In this case, transmission and/or reception of weak radio wave at the weak radio wave transmission and/or reception part 118S of the radio part 104S (FIG. 3) is effected via the antenna 167. A charger of a secondary cell inside the portable terminal 1022 is built in the station part 164. Since these portable terminals 1021, 1022 are within communication range capable of effecting transmission and/or reception of weak radio, if they are installed in the station part 164, it is shifted to a charge mode of the second cell.

Further, the portable terminal 1023 is used as a hand set, and configures a master terminal 172 as a structure to allows the control part 106M alone to function. In this case, the transmission and/or reception of the weak radio wave at the weak radio wave transmission and/or reception part 128M of the control part 106M (FIG. 3) is effected via the antenna 167.

Still further, the portable terminal 1024 is installed in the station part 174 of the antenna and a slave terminal 176 is configured to allow the radio part 104S alone to function. In this case, transmission and/or reception of weak radio wave at the weak radio wave transmission and/or reception part 118S of the radio part 104S (FIG. 3) is effected via the antenna 167. Further, an external antenna 178 is installed in the station part 174, and an AC power supply adapter 142 is connected to the station part 174. The external antenna 178 corresponds to an area having small number of base station of a new communication system, and complements unstableness of a call state at a weak electric field zone. A commercial AC alternate current power supply is connected to the AC power supply adapter 142, so that a stable DC voltage is supplied to the portable terminal 1024, which serves as a charger relative to the secondary cell of the power supply of the portable terminal 1024.

Accordingly, with the use of this master slave portable telephone system, multi-function communication and stable communication state are established by switching to the master terminals 166, 172 or the slave terminals 170, 176 and combining with the station parts 164, 174 as exemplified by the portable terminals 1021, 1022, 1023, 1024. For example, if the portable terminal 1024 is combined with the station part 174, it is possible to realize a compact and light weight terminal, high-function terminal, stable communication state, and so forth.

Further, the master terminal 166 or slave terminal 170 combined with the station part 164, or master terminal 172 serving as a hand set can effect a call or data communication through transmission and/or reception of the weak radio wave by the master slave portable telephone system, and if they combine with the slave terminal 176 installed in a location of window and so forth of a building, they can be utilized as a high-function terminal or a compact and light weight terminal. In this case, the master terminals 166, 172 and the slave terminals 170, 176 can be allowed to function as a normal terminal if they are outside of communication range of the transmission and/or reception of the weak radio wave.

Within the communication range of the transmission and/or reception of weak radio wave, transmission and/or reception of information is effected by transmission and/or reception of weak radio wave between the master terminal 166 and the slave terminal 176, and it is possible to communicate with the outside via the slave terminal 176. Further, transmission and/or reception of information is effected by transmission and/or reception of weak radio wave even between the master terminal 172 and the slave terminal 170, and it is possible to communicate with the outside via the slave terminal 176. In this case, when a call state is rendered unstable in the weak electric field zone, if the slave terminal 176 is installed in a location of the window of a building, it is possible to effect communication with the outside via the slave terminal 176 through transmission and/or reception of information by the transmission and/or reception of weak radio wave between the slave terminal 176 and the master terminal 172, thereby executing high-function processing such as mass data communication, high image quality display, high grade sound and so forth which are function of a portable terminal of a new communication system.

If the master slave portable telephone system is configured in that the portable terminal is connected to the external antenna by the provision of the station part having the external antenna and the installation of the portable terminal in the station part, it is possible to realize a stable communication state even in the weak electric field zone.

Still further, if it is configured that the portable terminal is allowed to function as a master terminal or a slave terminal within communication range of the information transmission and/or reception part, and the portable terminal is allowed to function as a normal terminal at the outside of communication range of the information transmission and/or reception part, it is possible to effect a stable radio call or transmission and/or reception of information while avoiding unstable communication in the weak electric field zone.

If the master slave portable telephone system is provided with a charger of the second cell which is built in the portable terminal at the station part as described above, it is possible to stabilize the call in the weak electric field zone and possible to charge the secondary cell, thereby enhancing convenience.

The processing outside the communication range of transmission and/or reception of the weak radio wave or at a strong electric field zone is now described with reference to FIG. 17. As shown in FIG. 17A, the portable terminal 102 is used independently, and the radio part 104 and the control part 106 thereof can effect information processing and communication. In this case, as shown in FIG. 17B, even if the portable terminal 102 is installed in the station part 164, the information processing and communication are similarly effected.

Ninth Embodiment

A ninth embodiment of the invention is described next with reference to FIG. 18. FIG. 18 shows a master slave portable telephone system according to the ninth embodiment of the invention.

The ninth embodiment is a mode of utilization for establishing communication utilizing public circuit network such as mobile communication telephone network and so forth and communication between a plurality of portable terminals at the same time, wherein communication and interphone communication by multiple user is realized. In this case, facing portable terminals 1021, 1022, 1023 are installed. The portable terminals 1021 to 1023 may be configured by any of the portable terminals as described in the first to eighth embodiments. In this embodiment, radio communication parts 179 of the portable terminals 1021 to 1023 may include, for example, transmission and/or reception switching parts 110, RF reception parts 112, RF transmission parts 114, base band parts 116 and so forth.

Figure 19:
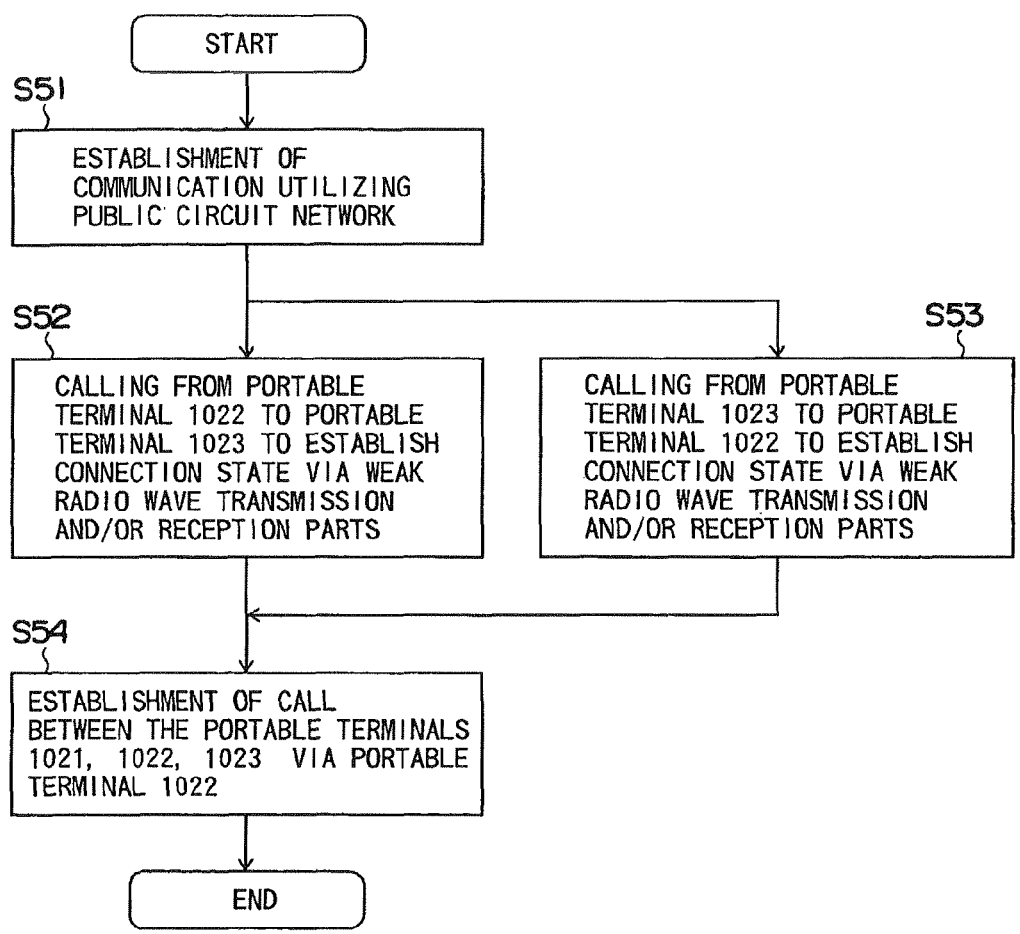
FIG. 19 is a flow chart showing a tripartite call using the master slave portable telephone system according to the ninth embodiment of the invention.

A tripartite communication in a plurality of portable terminals 1021 to 1023 is now described with reference to FIG. 19. FIG. 19 shows an example of the tripartite communication.

A call state is established utilizing a mobile communication telephone network between the portable terminals 1021, 1022 (step S51). This call is effected as a normal terminal using a radio part 104 and a control part 106 of the portable terminal 1022. Calling is effected from the control part 106 of the portable terminal 1022 to the portable terminal 1023 while maintaining a call state, thereby establishing a communication state via respective weak radio wave transmission and/or reception parts 128 (step S52). Further, in this case, a connection state can be also established by effecting calling from the control part 106 of the portable terminal 1023 to the portable terminal 1022 via respective the weak radio wave transmission and/or reception parts 128 (step S53). If such connection states are established, the control part 106 of the portable terminal 1023 is rendered in a connection state with the portable terminal 1021 via the portable terminal 1022. In such connection states, long range communication utilizing a public circuit network between the portable terminals 1021, 1022, and the short range communication between the portable terminals 1022, 1023 can be effected at the same time, and also the communication comprising short range and long range communications is established at the portable terminal 1023 via the portable terminal 1022 (step S54). That is, the communication modes are as follows.

a the portable terminal 1021—the portable terminal 1022
   b the portable terminal 1022—the portable terminal 1023
   c the portable terminal 1021—the portable terminal 1022—the portable terminal 1023

Figure 20:
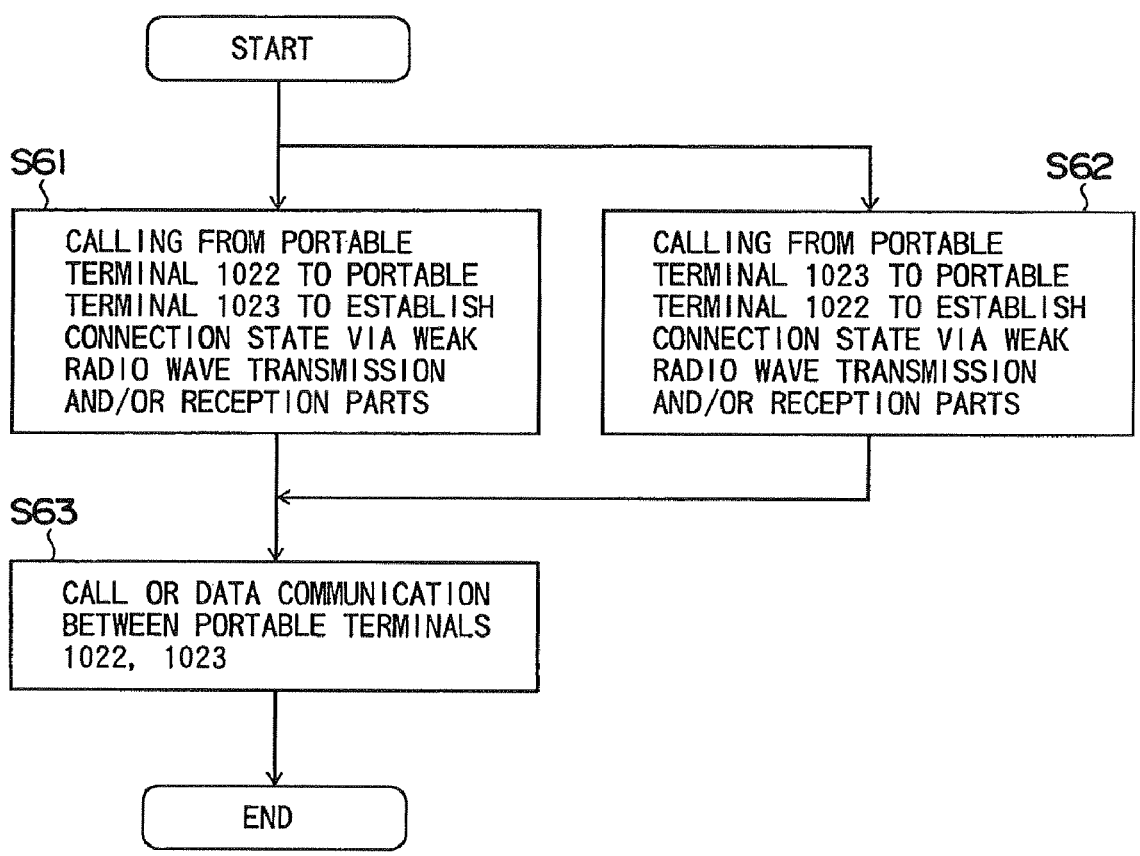
FIG. 20 is a flow chart showing an interphone call of the master slave portable telephone system according to the ninth embodiment of the invention.

An interphone function between the portable terminals 1022, 1023 are described next with reference to FIG. 20. FIG. 20 shows an example of the interphone function.

A connection state is established by effecting calling from the control part 106 of the portable terminal 1022 to the portable terminal 1023 via respective weak radio wave transmission and/or reception parts 128 (step S61). Further, in this case, a connection state can be established by effecting calling from the control part 106 of the portable terminal 1023 to the portable terminal 1022 (step S62) via respective weak radio wave transmission and/or reception parts 128. If such connection states are established, a call or data communication is effected between the control parts 106 of the portable terminals 1022, 1023 (step S63). That is, portable terminals 1022, 1023 capable of effecting a long-range communication can be used by an interphone unit, thereby effecting a call or data communication without intervening the pubic circuit network.

With such connection states by the interphone function, it is possible to communicate between the portable terminals 1022, 1023 and an external portable terminal 1021 utilizing a public circuit network such as a mobile telecommunication network and so forth.

Further, as described above, according to the master slave portable telephone system, high-function such as mass data communication, high image quality display, high grade sound quality and so forth can be utilized by the combination of a high-function portable terminal and the portable terminal having a normal function, thereby realizing high grade communication in the area having small number of base station and in the weak electric field zone. Thus, it is possible to effect the communication corresponding to the communication mode, location, and portable terminals through which a call is effected by use of the combination of the low performance portable terminal and the high-function portable terminal compared with the case of using only high-function portable terminals, thereby improving the convenience of the portable terminal.

Tenth to Twelfth Embodiments

Figure 21:
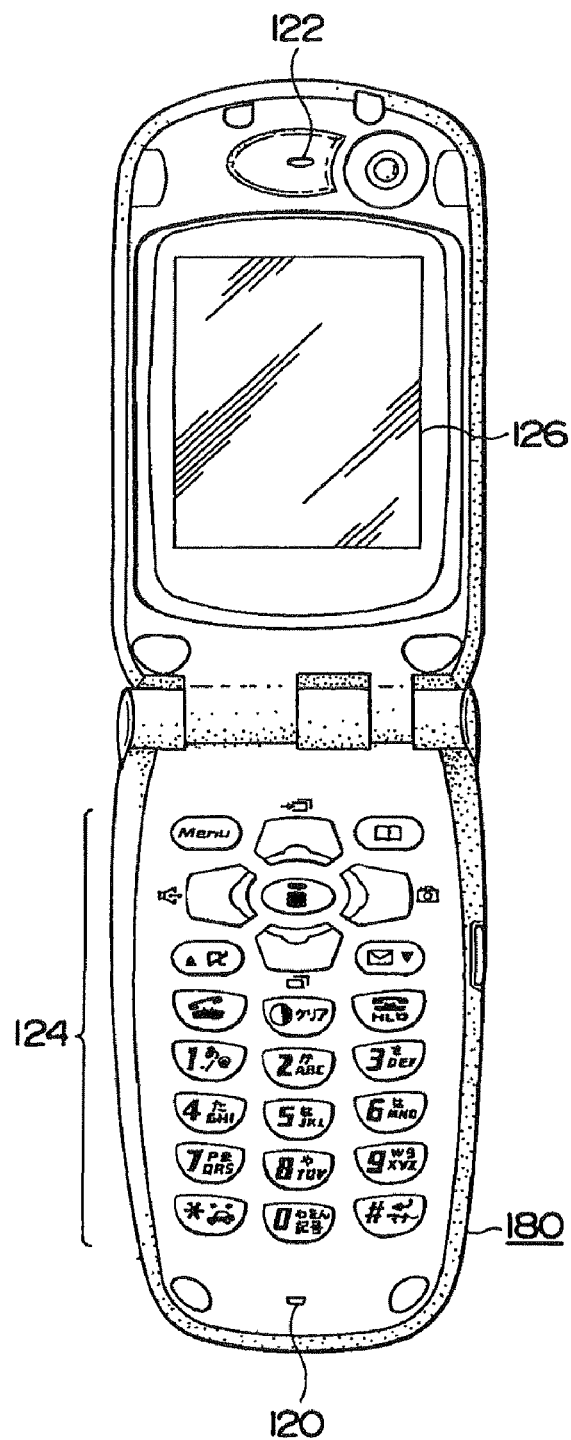
FIG. 21 is a front view showing a portable telephone according to a tenth embodiment of the invention.
Figure 23:
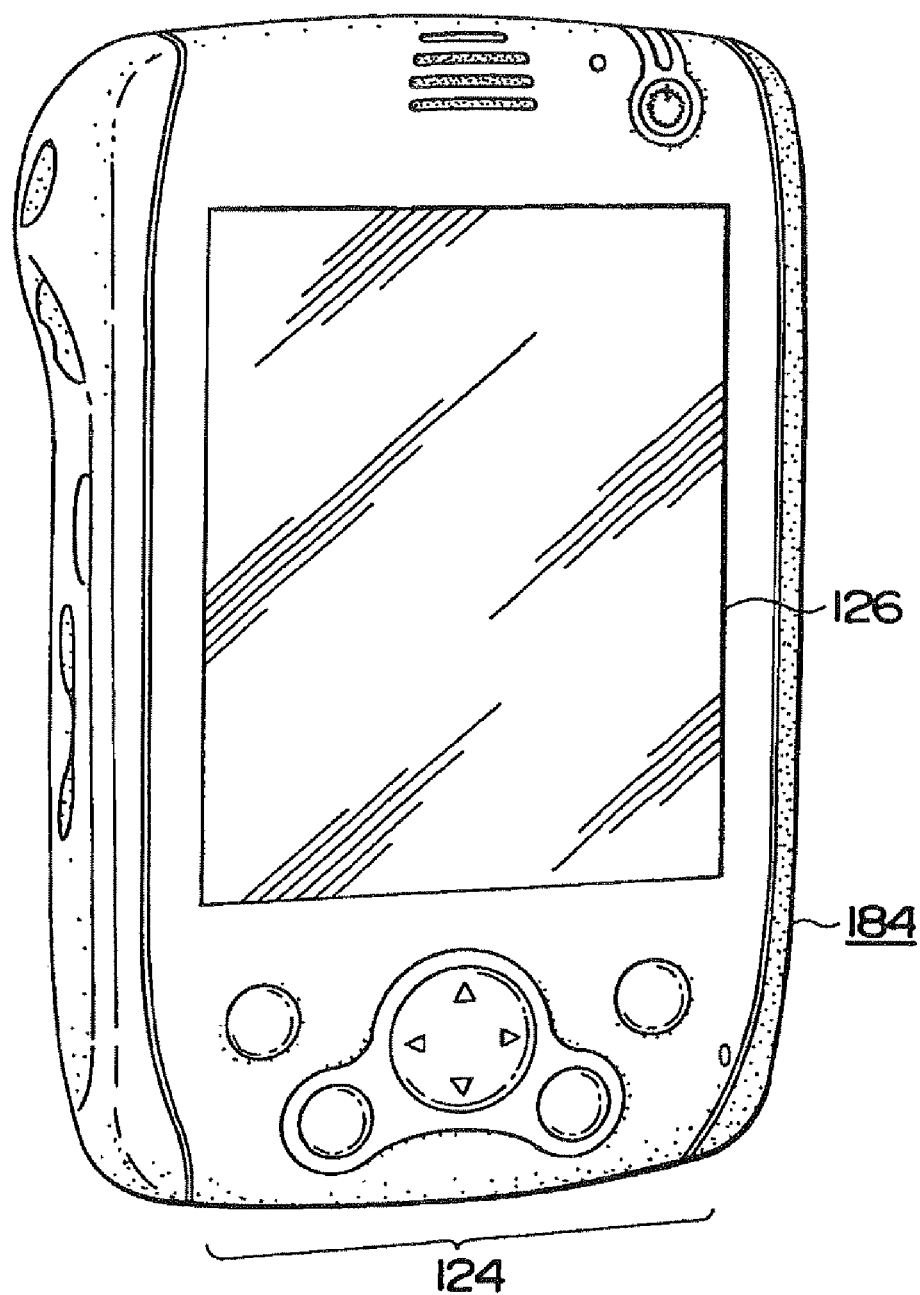
FIG. 23 is a perspective view showing a PDA according to a twelfth embodiment of the invention.
Figure 24:
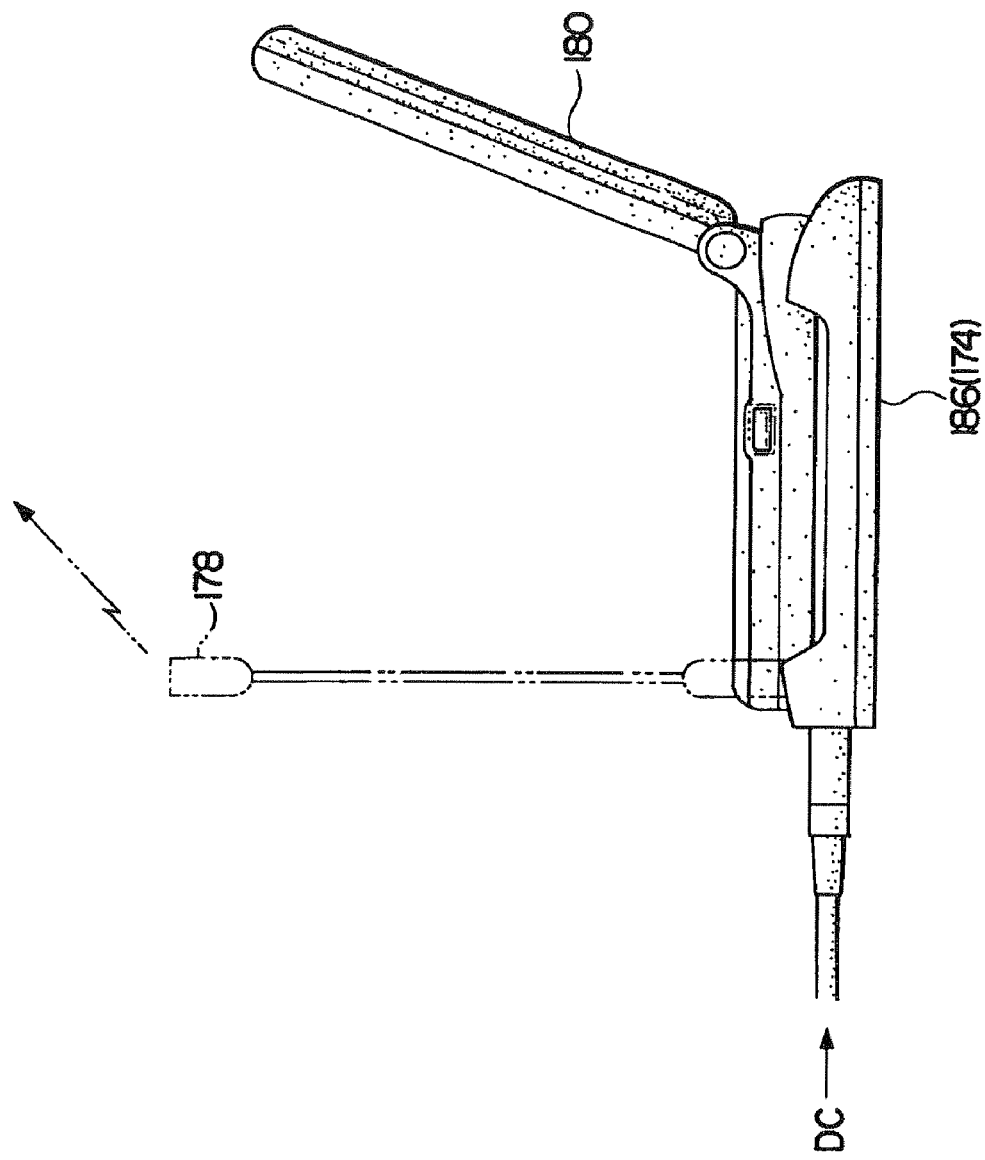
FIG. 24 is a side view showing a portable telephone installed in a charger.

Examples of a concrete configuration of portable terminals according to the tenth to twelfth embodiments of the invention are described next with reference FIGS. 21 to 23. The portable terminal of the invention is applied to a portable telephone 180 (tenth embodiment) shown in FIG. 21, a laptop computer 182 shown in FIG. 22 (eleventh embodiment) and a PDA 184 shown in FIG. 23 (twelfth embodiment), and common components as those of the first to ninth embodiments are depicted by the common reference numerals and the explanation thereof is omitted. The portable telephone 180 is installed, for example, on a charger 186 as shown in FIG. 24 and is capable of charging a secondary cell 140. In this case, if the charger 186 is installed in a station part 174 (FIG. 16), and an external antenna 178 is installed in the station part 174, a stable communication state can be realized even in a weak electric region.

Technical matters are extracted from the embodiments of the portable terminal and the master slave portable telephone system of the invention as set forth above, and the technical meaning, modification example, other technical expanded mattes and so forth are listed as follows.

(1) Although in the embodiments, for example, as shown in FIG. 3, the radio part 104S side is configured as the slave terminal and the control part 106M side is configured as the master terminal in one portable terminal, in the portable terminal 102 illustrated in FIG. 2, the radio part 104 side may be configured as the master terminal and the control part 106 side may be configured as the slave terminal so that the radio part 104 side and the control part 106 side are subjected to master slave according to the invention to function independently, thereby establishing various communication modes between itself and another portable terminal (for example, configuration showing in FIG. 16). The master terminal and the slave terminal are defined that an active side or a control side is the master terminal and a passive side or a side to be controlled is the slave terminal in one communication mode, so that either terminal may function as the master or slave terminal upon establishment of a communication.

(2) Although in the embodiments, the portable terminal 102 and so forth are exemplified, the configurations of the radio part 104 and the control part 106 are explained, and also transmission and/or reception of information through transmission and/or reception of weak radio wave by the weak radio wave transmission and/or reception parts 118, 128 and so forth have been described, it is possible to realize multi-function of the transmission and/or reception of a call or information by separating functions of the radio part 104 from those of the control part 106 in one portable terminal 102 and so forth. With the realization of such a function, it is possible to diversify communication modes, for example, by narrowing down the function of the high-function portable terminal and by adding a master function or slave function by use of compact and light weight multiple portable terminal which is the same level as the conventional type by use of a plurality of portable terminals, for example, two units of portable terminals.

(3) If a new communication system of high image quality display, high grade sound source, increase of memory capacity, and a portable terminal on which a signal processing element and so forth are mounted employs a station dedicated for a terminal of a PDA mode terminal provided with hardware and software corresponding to a high-function portable terminal according to the master slave portable telephone system, it is possible to realize high-function with ease.

(4) According to the master slave portable telephone system, it is possible to realize the shape of the portable terminal of the conventional communication system, for example, the size, weight and so forth, and also to realize mass data communication, high image quality display, high grade sound quality. Further, it is possible to establish a stable communication state by the combination with a station part having an external antenna, and to enjoy a communication state by the master terminal even in the area having small number of base station of the new communication system.

(5) It is possible to switch to the master terminal or slave terminal while installing the master slave function in the portable terminal, thereby enabling the manufacturing cost to be reduced by mass production of the portable terminal, so that a communication mode using high-function can be utilized when shifting from the conventional communication system to the new communication system, thereby enhancing buying inclination.

(6) Although the portable terminal such as a portable telephone and so forth are exemplified and described according to the embodiments, the invention can be applied to an information processing terminal such as PC and so forth, a digital camera, a watch, a portable radio and so forth, thereby utilizing them for telephone talk, data communication and so forth.

Although the invention has been described with reference to the most preferred embodiments as set forth above, the invention is not limited to the most preferred embodiments and it is natural that a person skilled in the art variously modifies and changes the invention based on a gist of the invention described in claims or detailed description of the invention, and such modification and changes are included in the scope of the invention.

The entire disclosure of No. JP 2003-092643 including specification, claims, drawings and summary are incorporated herein by reference in its entirety.

What is claimed is:

1. A portable terminal comprising:
an information transmission and/or reception part that effects transmission and/or reception of information;
a radio communication part that effects communication by radio;
an information processing part that processes said information;
a switching part that connects and disconnects connection among said radio communication part, said information processing part, and said information transmission and/or reception part,
a master terminal made up of said information transmission and/or reception part and said information processing part;
a slave terminal made up of said information transmission and/or reception part and said radio communication part; and
a normal terminal configured by combining said radio communication part with said information processing part via said information transmission and/or reception part,
wherein the switching part is configured such that said portable terminal can effect transmission and/or reception of said information relative to other portable terminals by selecting from one of the master terminal, the slave terminal and the normal terminal.

2. The portable terminal according to claim 1, wherein said portable terminal is a portable telephone.

* * * * *